US008482637B2

(12) United States Patent
Ohara et al.

(10) Patent No.: US 8,482,637 B2
(45) Date of Patent: Jul. 9, 2013

(54) IMAGING DEVICE AND IMAGING METHOD HAVING ZOOM OPTICAL SYSTEM INCLUDING A LIGHT WAVEFRONT MODULATION ELEMENT

(75) Inventors: Naoto Ohara, Tokyo (JP); Tomoya Sugita, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 396 days.

(21) Appl. No.: 12/593,562

(22) PCT Filed: Mar. 31, 2008

(86) PCT No.: PCT/JP2008/056355
§ 371 (c)(1),
(2), (4) Date: Oct. 21, 2009

(87) PCT Pub. No.: WO2008/123503
PCT Pub. Date: Oct. 16, 2008

(65) Prior Publication Data
US 2010/0110233 A1 May 6, 2010

(30) Foreign Application Priority Data

Mar. 29, 2007 (JP) ................................. 2007-087265
Mar. 26, 2008 (JP) ................................. 2008-081786

(51) Int. Cl.
*H04N 5/262* (2006.01)
*H04N 5/225* (2006.01)

(52) U.S. Cl.
USPC .................... 348/240.3; 348/240.99; 348/335

(58) Field of Classification Search
None
See application file for complete search history.

(56) References Cited

U.S. PATENT DOCUMENTS

| 5,748,371 | A | * | 5/1998 | Cathey et al. ................. 359/558 |
| 6,021,005 | A | | 2/2000 | Cathey, Jr. et al. |
| 6,069,738 | A | | 5/2000 | Cathey, Jr. et al. |
| 6,525,302 | B2 | | 2/2003 | Dowski, Jr. et al. |
| 6,642,504 | B2 | | 11/2003 | Cathey, Jr. et al. |
| 6,911,638 | B2 | * | 6/2005 | Dowski et al. ............ 250/201.9 |
| 7,180,673 | B2 | * | 2/2007 | Dowski, Jr. ................... 359/637 |
| 7,268,856 | B2 | * | 9/2007 | Shirota et al. .................. 355/67 |
| 7,576,791 | B2 | * | 8/2009 | Sonstroem ................... 348/335 |
| 7,924,341 | B2 | * | 4/2011 | Robinson ..................... 348/335 |

FOREIGN PATENT DOCUMENTS

| JP | 2003-235794 | 8/2003 |
| JP | 2004-153497 | 5/2004 |
| JP | 2005-148654 | 6/2005 |
| JP | 2007-060647 | 3/2007 |
| WO | WO 2008/123503 | 10/2008 |

OTHER PUBLICATIONS

Dowski, Edward R. Jr., et al., "Wavefront Coding: a modern method of archieving high-performance and/or low-cost imaging systems", Current Developments in Optical Designs and Optical Engineering VIII, Proc. SPIE vol. 3779, p. 137-145, Oct. 1999.

Dowski, Edward R. Jr., et al., "Wavefront Coding: jointly optimized optical and digital imaging systems", Ed. Proc. SPIE Visual Information Processing IX, vol. 4041, p. 114-120, Apr. 25, 2000.

* cited by examiner

*Primary Examiner* — Luong T Nguyen

(74) *Attorney, Agent, or Firm* — Procopio, Cory, Hargreaves & Savitch LLP

(57) ABSTRACT

An imaging device includes a zoom optical system including a light wavefront modulation element which has a light wavefront modulation function and is able to adjust a light wavefront modulation pattern, an imaging element capturing an image of an object passed through the zoom optical system, a modulation pattern control part controlling the light wavefront modulation pattern of the light wavefront modulation element, and an image processing part applying predetermined processing to an image signal of the object from the imaging element.

12 Claims, 22 Drawing Sheets

STATE OF LIGHT BEAMS BY OPTICAL SYSTEM

BEST FOCUS

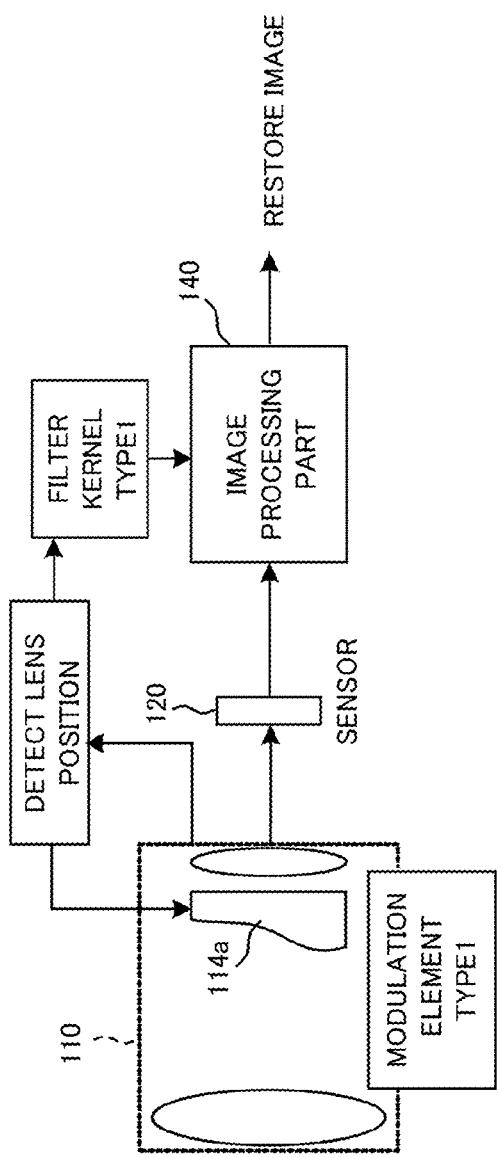
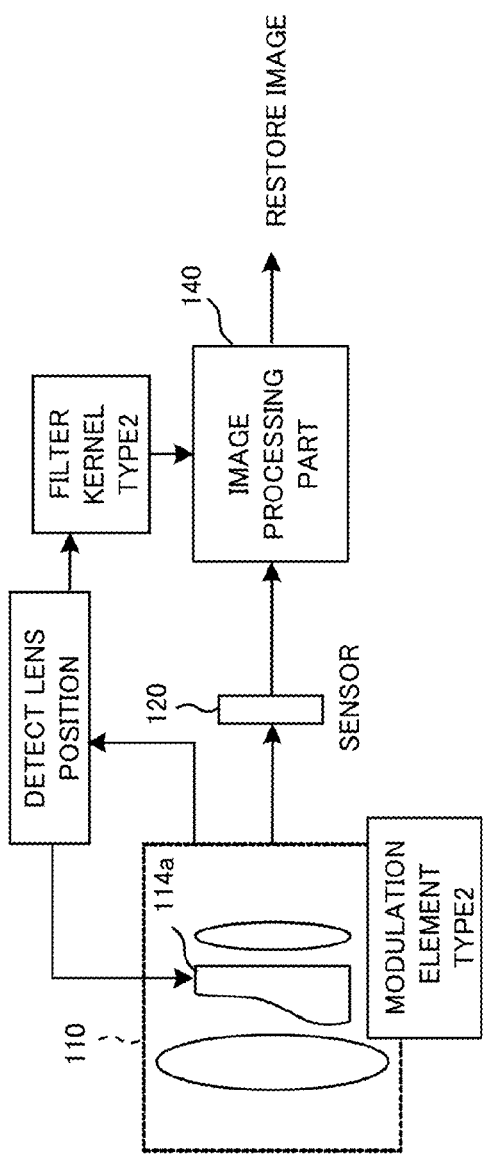

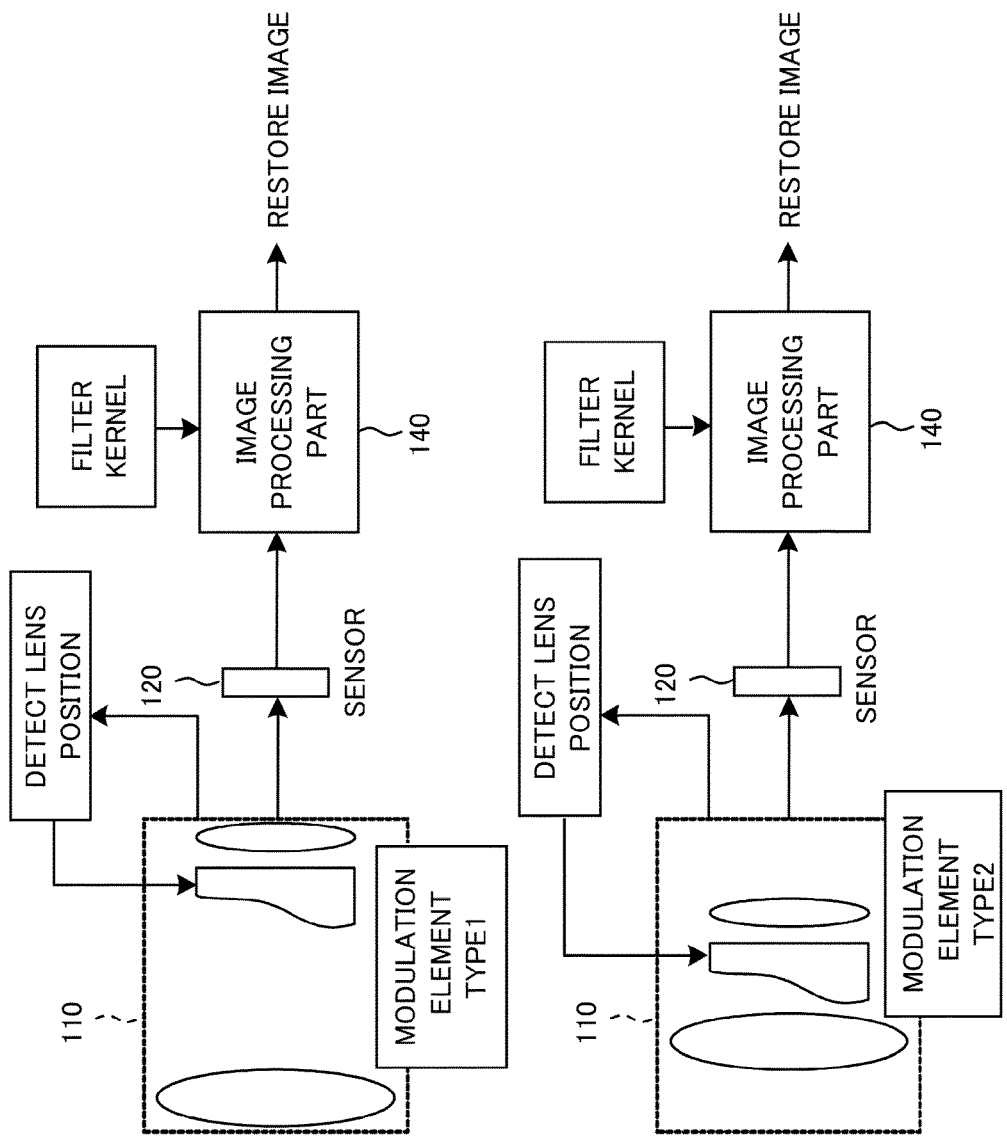

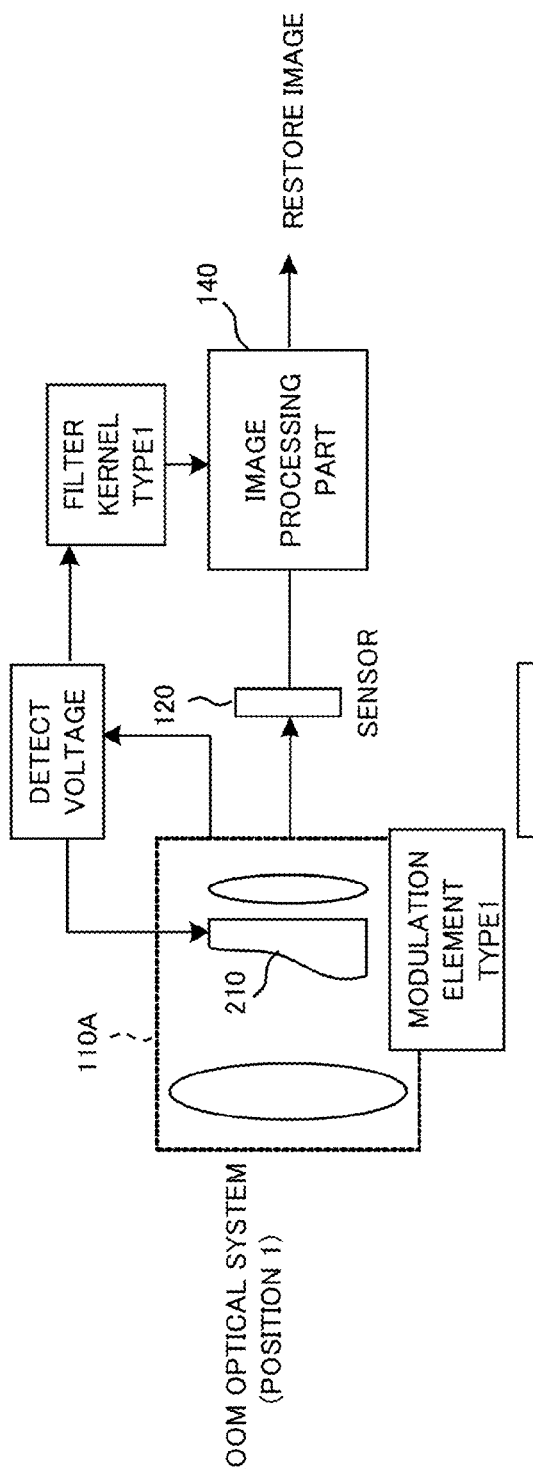
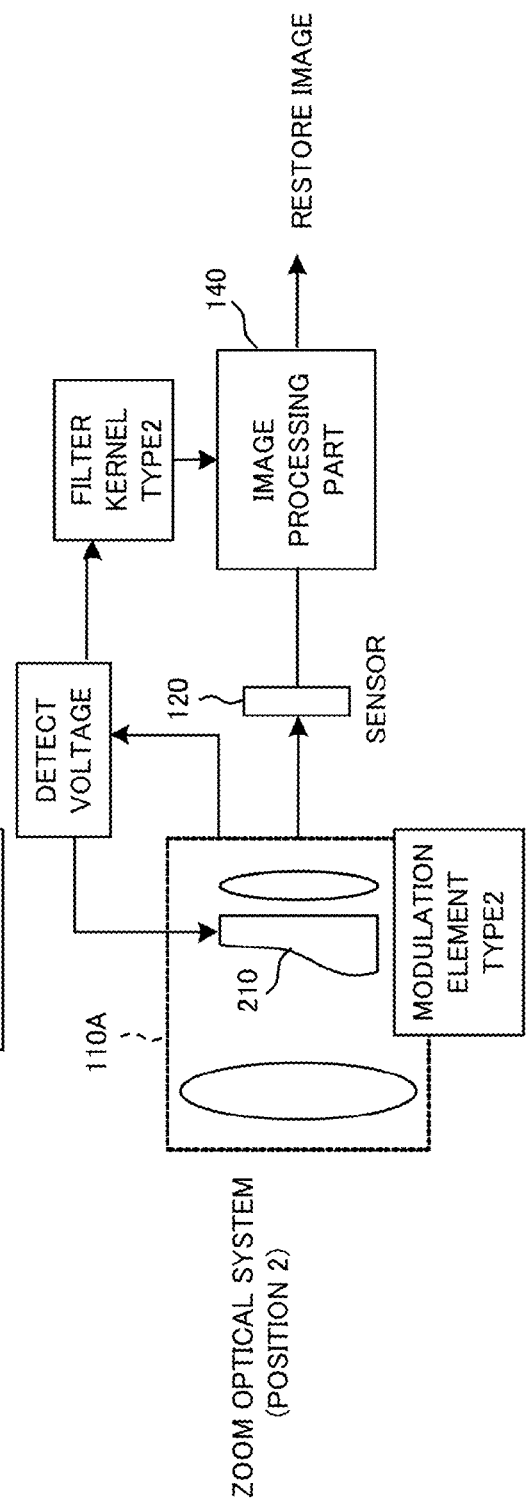

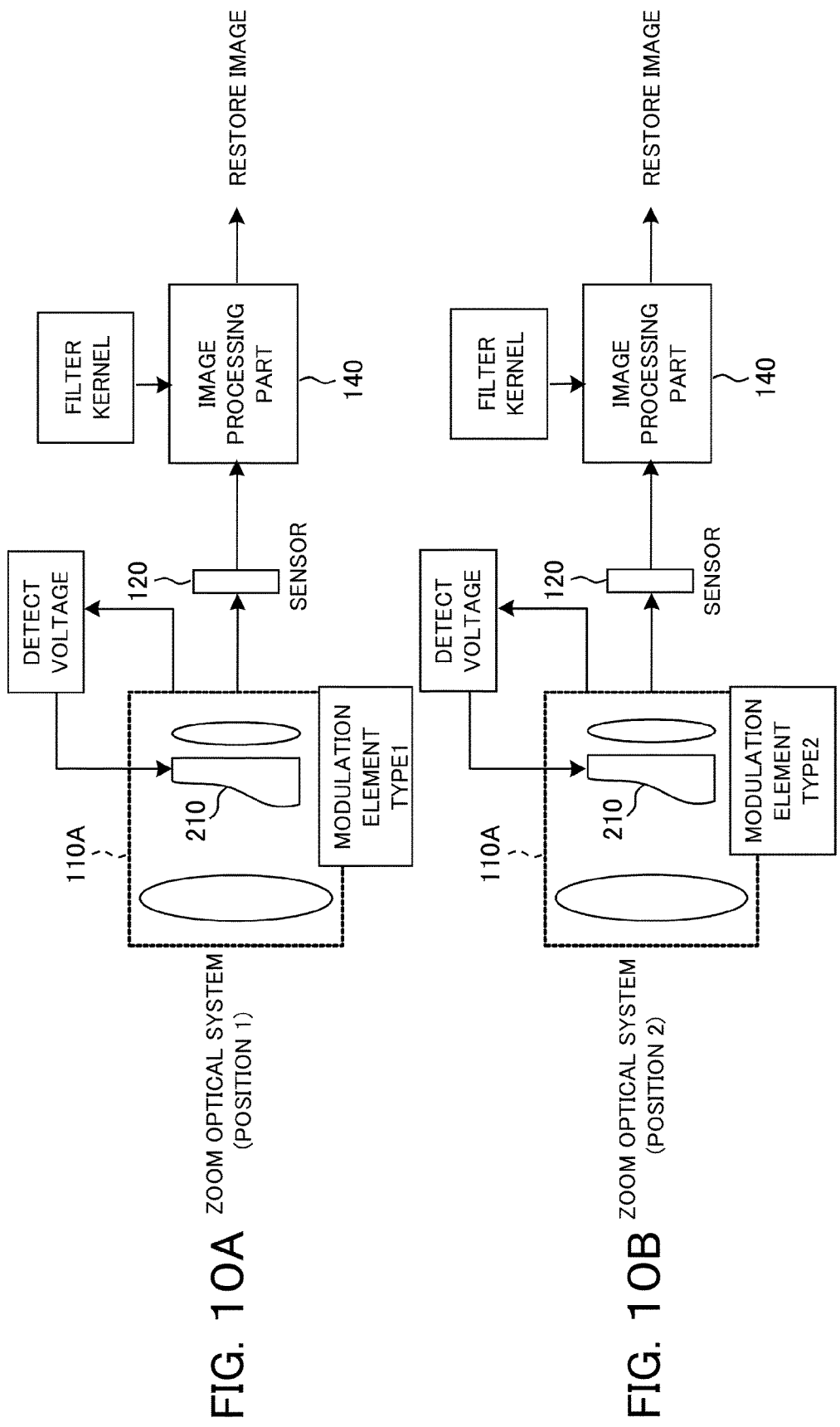

FIG. 11

EXAMPLE OF KERNEL TABLE

| STOP | F2.8 | F4 | F5.6 |
|---|---|---|---|
| KERNEL | A | B | C |

$$A = \begin{pmatrix} a & b \\ c & d \end{pmatrix}$$

$$B = \begin{pmatrix} a' & b' & c' \\ d' & e' & f' \\ g' & h' & i' \end{pmatrix}$$

$$C = \begin{pmatrix} a' & b' & c' & d' \\ e' & f' & g' & h' \\ i' & j' & k' & l' \\ m' & n' & o' & p' \end{pmatrix}$$

FILTER STRUCTURE

Defocus=0.2mm

FIELD(0.000, 0.000)

100.00

Best focus

FIELD(0.000, 0.000)

100.00

Defocus=-0.2mm

FIELD(0.000, 0.000)

100.00

FREQUENCY(1p/mm)
NOTE, NORMALIZED BY NYQUIST FREQUENCY

FREQUENCY(1p/mm)
NOTE, NORMALIZED BY NYQUIST FREQUENCY

IMAGING DEVICE AND IMAGING METHOD HAVING ZOOM OPTICAL SYSTEM INCLUDING A LIGHT WAVEFRONT MODULATION ELEMENT

FIELD OF THE INVENTION

The present invention relates to a digital still camera, a camera mounted in a mobile phone, a camera mounted in a personal digital assistant, an image inspection apparatus, an automatic control use industrial camera, or another imaging device using an imaging element and provided with an optical system and to an imaging method.

BACKGROUND

In recent years, rapid advances have been made in digitalization of information. This has led to remarkable efforts to meet with this in the imaging field.

In particular, as symbolized by the digital camera, in the imaging surfaces, film is being taken over by use of a solid imaging device such as a CCD (Charge Coupled Device) or CMOS (Complementary Metal Oxide Semiconductor) sensor in most cases.

An imaging lens device using a CCD or CMOS sensor for the imaging element in this way optically captures the image of an object by the optical system and extracts the image as an electric signal by the imaging element. Other than a digital still camera, this is used in a video camera, a digital video unit, a personal computer, a mobile phone, a personal digital assistant (PDA), an image inspection apparatus, an automatic control use industrial camera, and so on.

FIG. 1 is a view schematically showing the configuration of a general imaging lens device and a state of light beams.

This imaging lens device 1 has an optical system 2 and a CCD or CMOS sensor or other imaging element 3.

The optical system includes object side lenses 21 and 22, a stop 23, and an imaging lens 24 sequentially arranged from the object side (OBJS) toward the imaging element 3 side.

In the imaging lens device 1, as shown in FIG. 1, the best focus surface is made to match with the imaging element surface.

FIG. 2A to FIG. 2C show spot images on a light receiving surface of the imaging element 3 of the imaging lens device 1.

Further, imaging devices using phase plates to regularly disperse the light beams, using digital processing to restore the image, and thereby enabling capture of an image having a deep depth of field and so on have been proposed (see for example Non-patent Documents 1 and 2 and Patent Documents 1 to 5).

Further, an automatic exposure control system of a digital camera performing filtering using a transfer function has been proposed (see for example Patent Document 6).

Non-patent Document 1: "Wavefront Coding; jointly optimized optical and digital imaging systems", Edward R. Dowski, Jr., Robert H. Cormack, Scott D. Sarama.
Non-patent Document 2: "Wavefront Coding; A modern method of achieving high performance and/or low cost imaging systems", Edward R. Dowski, Jr., Gregory E. Johnson.
Patent Document 1: U.S. Pat. No. 6,021,005
Patent Document 2: U.S. Pat. No. 6,642,504
Patent Document 3: U.S. Pat. No. 6,525,302
Patent Document 4: U.S. Pat. No. 6,069,738
Patent Document 5: Japanese Patent Publication (A) No. 2003-235794
Patent Document 6: Japanese Patent Publication (A) No. 2004-153497

SUMMARY

All of the imaging devices proposed in the literature explained above are predicated on a PSF (Point Spread Function) being constant when inserting the above phase plate in the usual optical system. If the PSF changes, it is extremely difficult to realize an image having a deep depth of field by convolution using the subsequent kernels.

Accordingly, leaving aside lenses with a single focal point, in lenses of zoom systems, AF systems, etc., the high level of precision of optical design and the accompanying increase in costs cause a major problem in adoption of this.

In other words, in the above imaging device, suitable convolution processing is not possible. An optical design eliminating the astigmatism, coma aberration, zoom chromatic aberration, and other aberration causing deviation of the spot image at the time of the "wide" mode and at the time of the "tele" mode is required.

However, optical design eliminating these aberrations increases the difficulty of the optical design and induces problems such as an increase of the number of design processes, an increase of the costs, and an increase in size of the lenses.

Further, in the above art, when the zoom position changes in a zoom lens, wavefront aberration changes as well. If a restoration filter is prepared for each zoom position, in a case of a zoom with two focal points, two filters may be switched.

However, in a case of a linear zoom, a considerable amount of restoration filters becomes necessary. Further, if a phase modulation element is switched for each zoom position, a drive mechanism for switching becomes necessary, so the number of parts ends up increasing as well.

The present invention provides an imaging device and an imaging method not needing a switching mechanism of a modulation element in a depth expansion optical system, capable of realizing a precise modulation pattern in accordance with change of the zoom position, capable of simplifying the optical system and reducing costs, and capable of obtaining a good restored image which has a suitable image quality and is influenced by noise only a little.

An imaging system of a first aspect of the present invention has a zoom optical system including a light wavefront modulation element which has a light wavefront modulation function and can adjust a light wavefront modulation pattern, an imaging element capturing an image of an object passed through the zoom optical system, a modulation pattern control part controlling the light wavefront modulation pattern of the light wavefront modulation element, and an image processing part applying predetermined processing to an image signal of the object from the imaging element.

Preferably, the zoom optical system is a movable lens type zoom optical system moving the lens in a light axis direction, and the modulation pattern control part controls the light wavefront modulation pattern of the light wavefront modulation element in accordance with information concerning the movement of the lens of the zoom optical system.

Preferably, the information concerning the movement of the lens includes position information of the lens or drive information of the lens.

Preferably, the zoom optical system is a non-movable lens type zoom optical system having a lens fixed in position, and the modulation pattern control part controls the light wavefront modulation pattern of the light wavefront modulation element in accordance with information concerning the zoom control of the zoom optical system.

Preferably, the light wavefront modulation element is an outside dependent type light wavefront modulation element in which the control of the light wavefront modulation pattern depends on the outside.

Preferably, the light wavefront modulation element is an outside dependent type light wavefront modulation element in which the control of the light wavefront modulation pattern depends on an external voltage from the outside, the information concerning the zoom control includes a voltage value for each zoom position, and the modulation pattern control part applies a voltage in accordance with the voltage value for each zoom position as the external voltage to the outside dependent type light wavefront modulation element and controls the light wavefront modulation pattern.

Preferably, the image processing part has a function of performing filter processing for an optical transfer function (OTF) in accordance with the predetermined information, and the control of the modulation pattern of the modulation pattern control part is linked with switching of the filter acting upon the image processing part.

An imaging method of a second aspect of the present invention has a first step of controlling a light wavefront modulation pattern of a light wavefront modulation element in accordance with zoom control, a second step of capturing the object image passed through the zoom optical system including the light wavefront modulation element by the imaging element, and a third step of applying predetermined processing to the image signal of the object from the imaging element.

According to the present invention, in a depth expansion optical system, a switching mechanism of the light modulation element is unnecessary, a precise modulation pattern in accordance with a change of the zoom position can be realized, and blurriness making a restored image look better can be realized.

Further, there are the advantages that the optical system can be simplified, costs can be reduced, and in addition a goo restored image with a suitable image quality and with little influence of noise can be obtained.

BRIEF DESCRIPTION OF DRAWINGS

FIG. 2A to FIG. 2C are views showing spot images on a light receiving surface of an imaging device of the imaging lens device of FIG. 1, in which FIG. 2A is a view showing a spot image in a case where a focal point is deviated by 0.2 mm (defocus=0.2 mm), FIG. 2B is a view showing a spot image in a case of focus (best focus), and FIG. 2C is a view showing a spot image in a case where the focal point is deviated by −0.2 mm (defocus=−0.2 mm).

FIG. 7A and FIG. 7B are views showing an example in which a function of a filter (kernel) is switched as well parallel to switching of a voltage applied to a liquid crystal element in a movable lens type zoom optical system and an example in which the function of a filter (kernel) is not switched.

FIG. 8A and FIG. 8B are views showing examples in which the function of a filter (kernel) is not switched parallel to switching of a voltage applied to a liquid crystal element in a movable lens type zoom optical system.

FIG. 9A and FIG. 9B are views showing an example in which the function of a filter (kernel) is switched as well parallel to switching of a voltage applied to a liquid lens in a non-movable lens type zoom optical system and an example in which the function of the filter (kernel) is not switched.

FIG. 10A and FIG. 10B are views showing examples in which the function of a filter (kernel) is not switched parallel to switching of a voltage applied to a liquid lens in a non-movable lens type zoom optical system.

FIG. 11 is a view showing another example (F number) of storage data of a kernel data ROM.

FIG. 20A to FIG. 20C are views showing spot images on a light receiving surface of an imaging element according to the present embodiment, in which FIG. 20A is a view showing a spot image in the case where the focal point is deviated by 0.2 mm (defocus=0.2 mm), FIG. 20B is a view showing a spot image in the case of focus (best focus), and FIG. 20C is a view showing a spot image in the case where the focal point is deviated by −0.2 mm (defocus=−0.2 mm).

FIG. 21A and FIG. 21B are views for explaining MTF of a first order image formed by the imaging element according to the present embodiment, in which FIG. 21A is a view showing a spot image on the light receiving surface of an imaging element of an imaging lens device, and FIG. 21B shows an MTF characteristic with respect to a spatial frequency.

DETAILED DESCRIPTION

Below, embodiments of the present invention will be explained with reference to the accompanying drawings.

Figure 1:
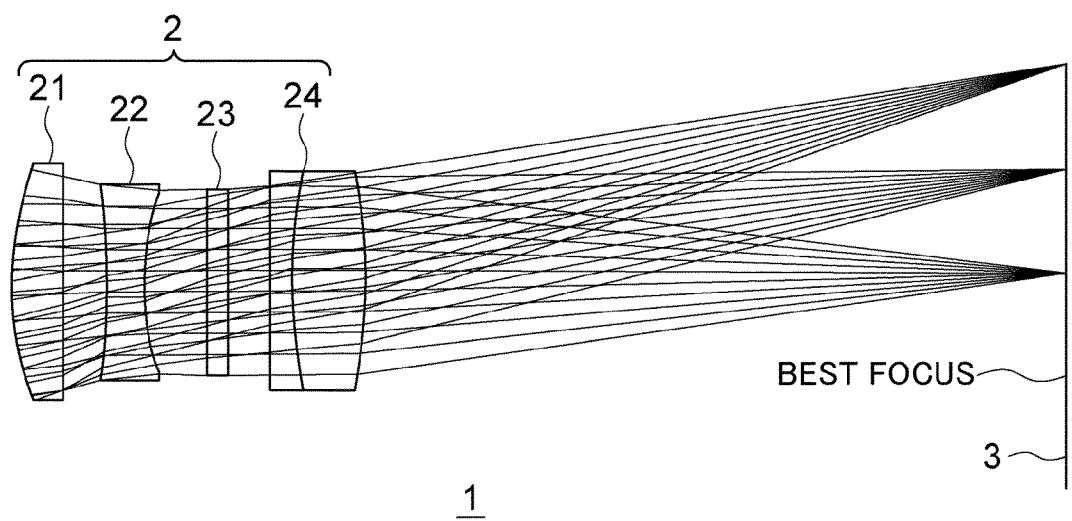
FIG. 1 is a view schematically showing the configuration of a general imaging lens device and a state of light beams.
Figure 2A:
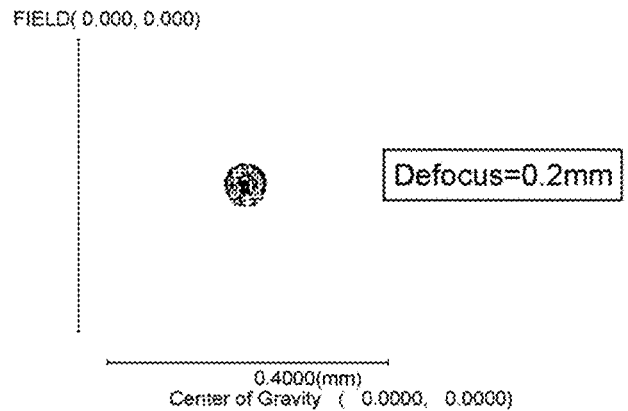
Figure 2B:
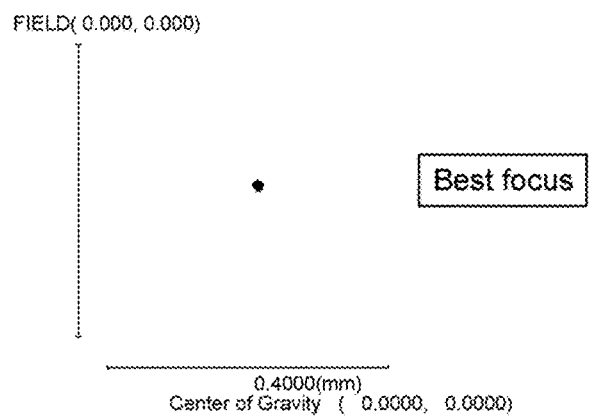
Figure 2C:
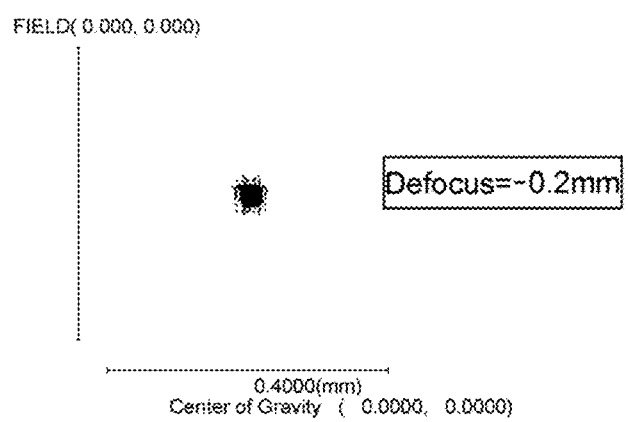
Figure 3:
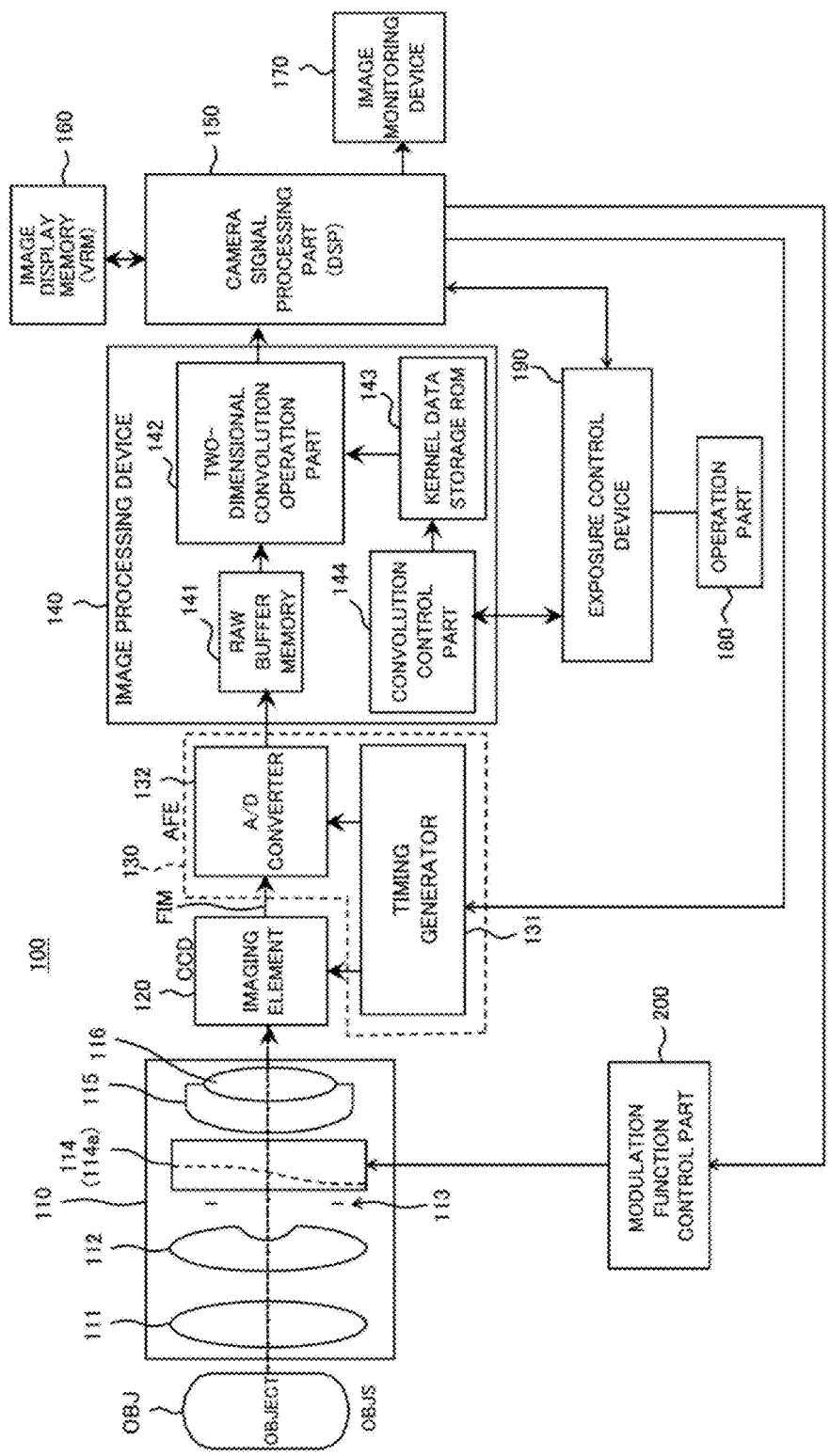
FIG. 3 is a block diagram showing the configuration of an imaging device according to an embodiment of the present invention.

FIG. 3 is a block diagram showing the configuration of an embodiment of an imaging device according to the present invention.

An imaging device 100 according to the present embodiment has a zoom optical system 110, imaging element 120, analog front end part (AFE) 130, image processing device 140, camera signal processing part 150, image display memory 160, image monitoring device 170, operation part 180, exposure control device 190, and a modulation pattern control part constituted by a modulation function control part 200.

In the present embodiment, the zoom optical system can be configured as a movable lens type zoom optical system moving the lens in the light axis direction or a non-movable lens type zoom optical system in which the position of the lens is fixed.

The zoom optical system 110 of FIG. 3 is configured as a movable lens type zoom optical system and supplies an image of the object OBJ captured to the imaging element 120.

The zoom optical system 110 of FIG. 3 has a first lens 111, a second lens 112, a stop 113, an outside dependent type light wavefront modulation element 114, a third lens 115, and a fourth lens 116 sequentially arranged from for example the object side OBJS.

The third lens 115 and the fourth lens 116 are joined and function as an image-forming lens for making the imaging element 120 to form an image.

In the outside dependent type light wavefront modulation element 114, the modulation pattern (modulation amount or degree of modulation) of the light wavefront modulation function deforming the wavefront for forming an image on the light receiving surface of the imaging element 120 by the image-forming lens depends on an external signal voltage.

In the outside dependent type light wavefront modulation element 114, the optical system 110 enters a multi-focal point state when the light wavefront modulation function is controlled to a manifested state by the modulation function control part 200.

In the imaging device 100 of FIG. 3, the modulation function control part 200 controls the light wavefront modulation pattern of the outside dependent type light wavefront modulation element 114 in accordance with information concerning the movement of the lens of the zoom optical system 110. Here, the information concerning the movement of the lens includes the position information of the lens or information of a drive signal of the lens.

Note that, in the outside dependent type light wavefront modulation element 114, it is also possible to control the light wavefront modulation function to a non-manifested state by the modulation function control part 200. In this case, it is also possible to configure the optical system 110 to become a single-focal point state and have a good image-forming performance.

Figure 4A:
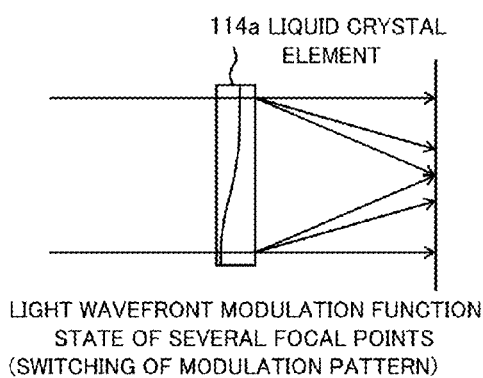
FIG. 4A and FIG. 4B are views for explaining an example of the configuration and a function of an outside dependent type light wavefront modulation element according to the present embodiment.
Figure 4B:
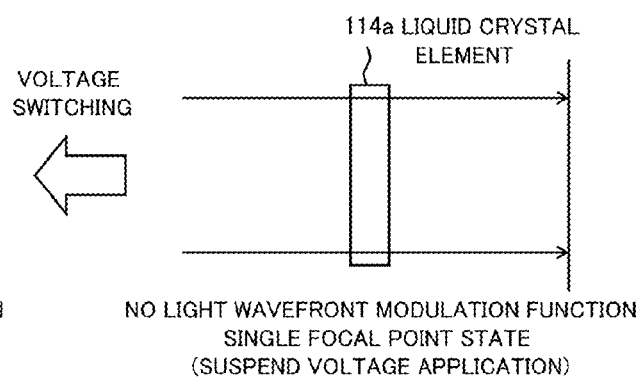

FIG. 4A and FIG. 4B are views for explaining an example of the configuration and the function of the outside dependent type light wavefront modulation element according to the present embodiment.

The outside dependent type light wavefront modulation element 114 can be configured by for example a liquid crystal element 114a as shown in FIG. 4A and FIG. 4B.

This liquid crystal element 114a can change a condensing state of light beams by switching the voltage to be given to the element.

For example, when a voltage is applied by the modulation function control part 200, as shown in FIG. 4A, the liquid crystal element 114a is controlled so that the light wavefront modulation function is manifested, and the optical system 110 enters a multi-focal point state. Then, by changing the voltage to be applied, the modulation pattern can be switched to the desired pattern.

On the other hand, when voltage application is suspended (or set at a lower level than that in the manifested state) by the modulation function control part 200, as shown in FIG. 4B, the liquid crystal element 114a is controlled so that the light wavefront modulation function is not manifested, and the optical system 110 enters a single focal point state.

Figure 5:
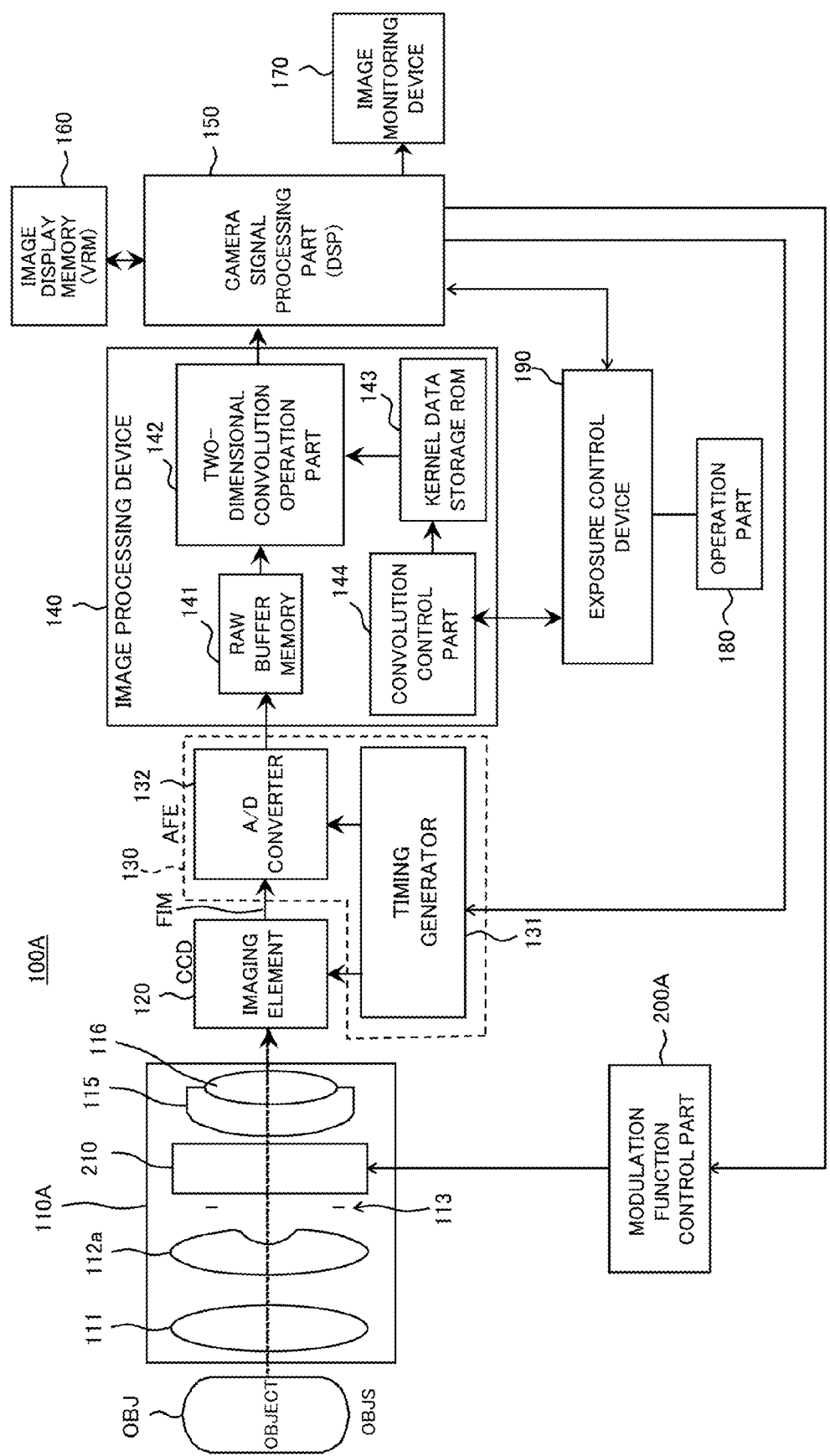
FIG. 5 is a view for explaining another example of the configuration of an optical system according to the present embodiment.

Further, it is also possible to configure a zoom optical system 110A as a non-movable lens type zoom optical system as shown in FIG. 5.

The zoom optical system 110A of FIG. 5 has an optical zoom use lens constituted by a liquid lens 210. It is also possible to arrange the liquid lens 210 closest to for example the object side OBJS of the zoom optical system 110.

In the liquid lens 210, the lens surface is formed by the interface of an aqueous solution and an oil sealed in a container. This is configured so that by changing the shape of this interface according to the voltage applied by a modulation function control part 200A, a desired refraction power is obtained. A zoom function is thereby realized.

In this case, the modulation function control part 200A controls the light wavefront modulation pattern of the liquid lens 210 functioning as the light wavefront modulation element as well in accordance with information concerning the zoom control of the zoom optical system 110A.

Here, the information concerning the zoom control includes a voltage value for each zoom position. The modulation function control part 200A applies a voltage in accordance with the voltage value for each zoom position to outside dependent type light wavefront modulation element constituted by the liquid lens 210 as the external voltage to control the light wavefront modulation pattern.

The imaging element 120 is formed by a CCD or CMOS sensor in which the image captured by the zoom optical system 110 is formed and which outputs image-formed first order image information as a first order image signal FIM of an electric signal to the image processing device 140 through the analog front end part 13.

In FIG. 3 and FIG. 5, the imaging element 120 is described as a CCD as an example.

The analog front end part 130 has a timing generator 131 and an analog/digital (A/D) converter 132.

The timing generator 131 generates a drive timing of the CCD of the imaging element 120. The A/D converter 132 converts an analog signal input from the CCD to a digital signal and outputs the result to the image processing device 140.

The image processing device (two-dimensional convolution part) 140 forming a portion of the image processing part receives as input the digital signal of the captured image coming from the AFE 130 in a preceding stage, applies two-dimensional convolution processing to this, and transfers the result to the camera signal processing part (DSP) 150 in a later stage.

The image processing device 140 performs for example filter processing on the optical transfer function (OTF) in accordance with the exposure information of the exposure control device 190 and performs processing to restore image deterioration in which it corrects color aberration so as to reduce color aberration. Note that, the stop information is included as the exposure information.

The image processing device 140 has a function of generating a dispersion-free image signal from a dispersed image signal of an object from the imaging element 120. Further, the image processing part has a function of applying noise reduction filtering in the first step.

The processing of the image processing device 140 will be explained in further detail later.

The camera signal processing part (DSP) 150 performs color interpolation, white balancing, YCbCr conversion processing, compression, filing, and other processing, and performs storage in the memory 160, image display on the image monitoring device 170, and so on. The image monitoring device 170 can output color or output black/white under the control of the camera signal processing part 150.

The camera signal processing part 150 performs linkage with manifestation/non-manifestation of the light wavefront modulation function (inverse light wavefront modulation function) by the modulation function control part 200 and switching of application of a filter (kernel), linkage with switching of color output or black/white output, link control with switching of the color aberration correction function etc. by co-operation of the exposure control device 190 and the modulation function control part 200.

The exposure control device 190 performs the exposure control and waits for the operation inputs of the operation part 180 etc., determines the operation of the entire system in accordance with those inputs, controls the AFE 130, image processing device 140, camera signal processing part 150, etc., and oversees arbitration control of the entire system.

The modulation function control part 200 of FIG. 3 controls the light wavefront modulation pattern of the outside dependent type light wavefront modulation element 114 according to a voltage in response to an instruction of the camera signal processing part 150.

In this case, as explained before, the modulation function control part 200 controls the light wavefront modulation pattern of the outside dependent type light wavefront modulation element 114 in accordance with information concerning the movement of the lens of the zoom optical system 110. Here, the information concerning the movement of the lens includes the position information of the lens or the information of the drive signal of the lens.

The modulation function control part 200A of FIG. 5 controls the zoom function and the light wavefront modulation pattern of the liquid lens 210 as the outside dependent type light wavefront modulation element according to the voltage in response to the instruction of the camera signal processing part 150.

In this case, as explained before, the modulation function control part 200A controls the light wavefront modulation pattern of the liquid lens 210 functioning as the light wavefront modulation element as well in accordance with the information concerning the zoom control of the zoom optical system 110A.

Here, the information concerning the zoom control includes the voltage value for each zoom position, and the modulation function control part 200A applies a voltage in accordance with the voltage value for each zoom position as the external voltage to the outside dependent type light wavefront modulation element constituted by the liquid lens 210 and controls the light wavefront modulation pattern.

Below, the configurations and functions of the optical system and the image processing device of the present embodiment will be specifically explained.

Note that, in the present embodiment, the case of using an outside depending type light wavefront modulation element was explained. However, the light wavefront modulation element of the present invention may be any element so far as it deforms the wavefront. It may be an optical element changing in thickness (for example, a third order phase plate), an optical element changing in refractive index (for example a refractive index distribution type wavefront modulation lens), an optical element changing in thickness and refractive index according to coding to the lens surface (for example, a wavefront modulation hybrid lens), a liquid crystal element capable of modulating the phase distribution of the light (for example, a liquid crystal spatial phase modulation element), or another light wavefront modulation element.

The light wavefront modulation element is an optical part regularly dispersing light beams converged by the optical system. By inserting this phase plate, an image not focused anywhere on the imaging element 120 is realized.

In other words, the light wavefront modulation element forms light beams having a deep depth (playing a central role in the image formation) and flare (blurred portion).

The means for restoring this regularly dispersed image to a focused image by digital processing without moving the optical systems 110 and 110A is referred to as a "wavefront aberration control optical system" or a "depth expansion optical system (DEOS)". This processing is carried out in the image processing device 140.

Here, the basic principle of the DEOS will be explained.

Figure 6:
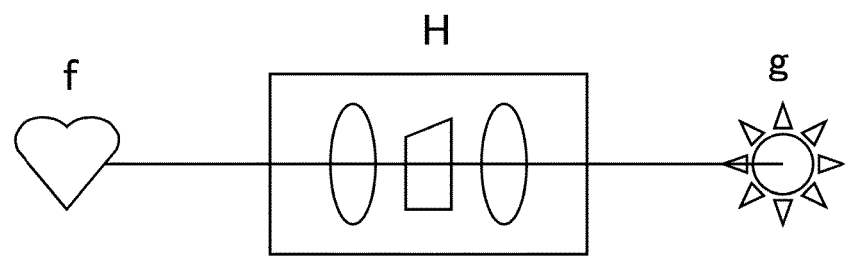
FIG. 6 is a view for explaining the principle of DEOS.

As shown in FIG. 6, an image f of an object enters the DEOS optical system H, whereby an image 2 is generated.

This can be represented by the following equation.

$$g = H*f \qquad \text{(Equation 1)}$$

where, * represents convolution.

In order to find the object from the generated image, the next processing is required.

$$f = H^{-1}*g \qquad \text{(Equation 2)}$$

Here, the kernel size and operational coefficients concerning H will be explained.

Assume that the zoom positions are $ZP_n$, $ZP_{n-1}$, . . . . Further, assume that the H functions thereof are $H_n$, $H_{n-1}$, . . . .

The spot images are different, therefore the H functions become as follows.

$$Hn = \begin{pmatrix} a & b & c \\ d & e & f \end{pmatrix} \qquad \text{[Equation 3]}$$

$$Hn-1 = \begin{pmatrix} a' & b' & c' \\ d' & e' & f' \\ g' & h' & i' \end{pmatrix}$$

The difference of the number of rows and/or the number of columns of this matrix is referred to as the "kernel size". The numbers are the operational coefficients.

Here, the H functions may be stored in the memory or a PSF may be set as a function of the object distance and the object distance used for calculations to calculate an H function and thereby enable setting to create the optimum filter for any object distance. Further, the H function may be directly found according to the object distance using the H function as a function of the object distance.

The present embodiment is configured, as shown in FIG. 3 and FIG. 5, to receive an image from the optical system 100 or 110A at the imaging element 120, input it to the image processing device 140, acquire a conversion coefficient in accordance with the optical system, and generate a dispersion-free image signal from a dispersed image signal from the imaging element 120 with the acquired conversion coefficient.

Note that, in the present embodiment, "dispersion" means the phenomenon where, as explained above, inserting the light wavefront modulation element 114 or 114a causes the formation of an image not focused anywhere on the imaging element 120 and the formation of light beams having a deep depth (playing a central role in the image formation) and flare (blurred portion) by the phase plate 113 and includes the same meaning as aberration because of the behavior of the image being dispersed and forming a blurred portion. Accordingly, in the present embodiment, it is sometimes also explained as aberration.

For example, the optical system 110 shown in FIG. 3 is provided with an outside dependent type light wavefront modulation element 114 in which the modulation pattern of the light wavefront modulation function deforming the wavefront of the image formation on the light receiving surface of the imaging element 120 by the image-formed lens depends on the outside.

In the outside dependent type light wavefront modulation element 114, the optical system 110 enters a single focal point state and has a good image forming performance when the light wavefront modulation function is controlled to the non-manifested state by the modulation function control part 200, but the optical system 110 enters the multi-focal point state when it is controlled to the manifested state.

In the present embodiment, by changing the voltage to the liquid crystal element 114a, a light wavefront modulation action, for example, a phase modulation action, is caused. At this time, the liquid crystal element 114a is brought to the multi-focal point state. By restoring this multi-focal point state image, occurrence of a depth expansion action can be realized.

In this way, the imaging device 100 having the optical system 110 of FIG. 3 changes the light wavefront modulation pattern by switching of the voltage applied to the liquid crystal element 114a. At this time, it is also possible to control the imaging device so that the light wavefront (phase) modulation and presence/absence of the image restoration (switching of application of the filter (kernel)) are linked.

FIG. 7A and FIG. 7B are views showing an example where the function of the filter (kernel) is switched as well parallel to the switching of the voltage applied to the liquid crystal element in the movable lens type zoom optical system and an example where the function of the filter (kernel) is not switched.

As shown in FIG. 7A, when the liquid crystal element 114a manifests (has) the light wavefront modulation function (action) and for example the liquid crystal element 114a moves to the imaging element (sensor) 120 side, the application voltage to the liquid crystal element 114a is controlled in accordance with this position information to form a desired modulation pattern and make the filter function and restore an image. Due to that, a depth expanded restored image is obtained.

On the other hand, as shown in FIG. 7B, when the liquid crystal element 114a manifests (has) the phase modulation function (action) and for example the liquid crystal element 114a is located at schematically the center of the optical system 110, the application voltage to the liquid crystal element 114a is controlled in accordance with this position information to form a desired modulation pattern and make the filter function and restore an image. In this case, use is made of a kernel having a size different from the case of FIG. 7A.

FIG. 8A and FIG. 8B are views showing examples where the function of the filter (kernel) is not switched parallel to the switching of the voltage applied to the liquid crystal element in the movable lens type zoom optical system.

As shown in FIG. 8A, when the liquid crystal element 114a manifests (has) the light wavefront modulation function (action) and for example the liquid crystal element 114a moves to the imaging element 120 side, the application voltage to the liquid crystal element 114a is controlled in accordance with this position information to form a desired modulation pattern, but the image is restored without making the filter function. Due to that, a depth expanded restored image is obtained.

On the other hand, as shown in FIG. 8B, when the liquid crystal element 114a manifests (has) the light wavefront modulation function (action) and for example the liquid crystal element 114a is located at schematically the center of the optical system 110, the application voltage to the liquid crystal element 114a is controlled in accordance with this position information to form a desired modulation pattern and make the filter function and restore an image. In this case, use is made of the same kernel as that in the case of FIG. 8A.

FIG. 9A and FIG. 9B are views showing an example where the function of the filter (kernel) is switched as well parallel to the switching of the voltage applied to the liquid lens in a non-movable lens type zoom optical system.

As shown in FIG. 9A, when the liquid lens 210 manifests (has) the zoom function and the light wavefront modulation function (action) and for example the liquid lens 210 is controlled to the first zoom position, the application voltage to the liquid lens 210 is controlled in accordance with the information of this first zoom position to form a desired modulation pattern and make the filter function and restore the image. Due to that, a depth expanded restored image is obtained.

On the other hand, as shown in FIG. 9B, when the liquid lens 210 manifests (has) the light wavefront modulation function (action) and for example the liquid lens 210 is controlled to the second zoom position, the application voltage to the liquid lens 210 is controlled in accordance with the information of this second zoom position to form a desired modulation pattern and make the filter function and restore the image. In this case, use is made of a kernel having a size different from that in the case of FIG. 9A.

FIG. 10A and FIG. 10B are views showing examples where the function of the filter (kernel) is not switched parallel to the switching of the voltage applied to the liquid lens in a non-movable lens type zoom optical system.

As shown in FIG. 10A, when the liquid lens 210 manifests (has) the zoom function and the light wavefront modulation function (action) and for example the liquid lens 210 is controlled to the first zoom position, the application voltage to the liquid lens 210 is controlled in accordance with the information of this first zoom position to form a desired modulation pattern and make the filter function and restore the image. Due to that, the depth expanded restored image is obtained.

On the other hand, as shown in FIG. 10B, when the liquid lens 210 manifests (has) the zoom function and the light wavefront modulation function (action) and for example the liquid lens 210 is controlled to the second zoom position, the application voltage to the liquid lens 210 is controlled in accordance with the information of this second zoom position to form a desired modulation pattern and make the filter function and restore the image. In this case, use is made of the same kernel as that in the case of FIG. 10A.

Note that, assume that the optical systems 110 and 110A in FIG. 7A to FIG. 10 have the same configurations as those of the optical systems 110 and 110A in FIG. 3 and FIG. 5 although the configuration is partially omitted.

Next, the configuration and processing of the image processing device 140 will be explained.

The image processing device 140, as shown in FIG. 3, has a raw buffer memory 141, convolution computer 142, storage means constituted by a kernel data storage ROM 143, and convolution control part 144.

The convolution control part 144 performs on/off control of the convolution processing, control of screen size, switching of kernel data, etc. and is controlled by the exposure control device 190.

Further, the kernel data storage ROM 143, as shown in FIG. 11, stores kernel data for convolution calculated by the PSF of each optical system prepared in advance. The zoom information of the zoom optical system explained before and/or exposure information determined at the time of setting of the exposure by the exposure control device 190 is acquired, and the kernel data is selected and controlled through the convolution control part 144.

Note that, the exposure information includes the stop information. Below, an explanation will be given by taking as an example a case where the kernel data is selected and controlled by adding the exposure information.

Further, in the example of FIG. 11, kernel data A becomes data corresponding to an F number (2.8) as the stop information, kernel data B becomes data corresponding to an F number (4), and kernel data C becomes data corresponding to an F number (5.6).

The filter processing in accordance with the stop information is carried out as in the example of FIG. 11 for the following reason.

Where the capturing is carried out by closing the stop, the light wavefront modulation element is covered by the stop and the phase changes, therefore it becomes difficult to restore a suitable image.

Therefore, in the present embodiment, as in the present example, by performing the filter processing in accordance with the stop information in the exposure information, a suitable image restoration is realized.

Figure 12:
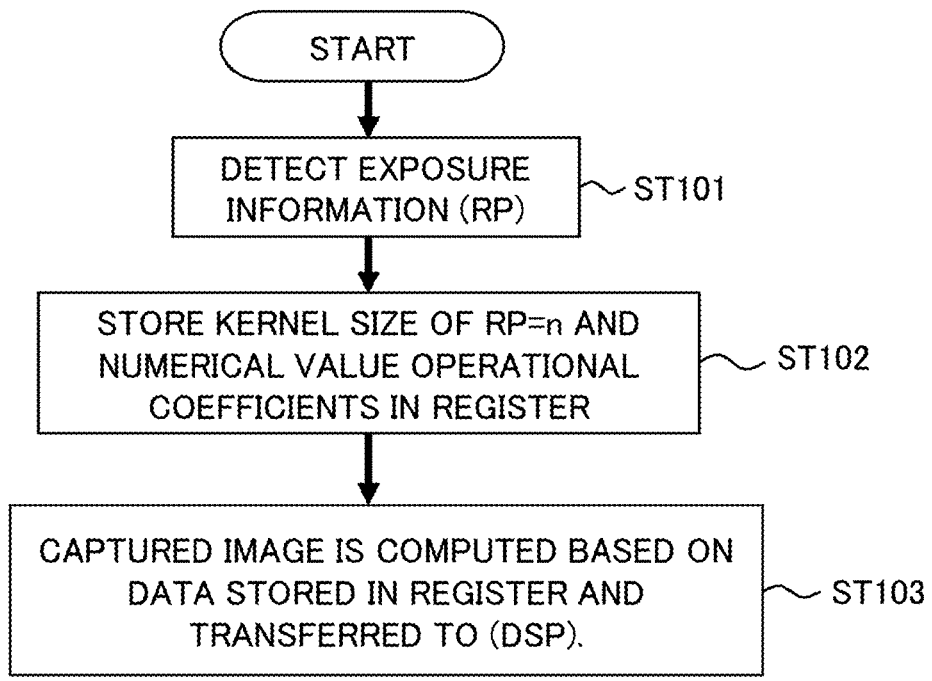
FIG. 12 is a flow chart schematically showing an optical system setting processing of an exposure control device.

FIG. 12 is a flow chart of a switching processing according to the exposure information (including the stop information) of the exposure control device 190.

First, the exposure information (RP) is detected and supplied to the convolution control part 144 (ST101).

In the convolution control part 144, from the exposure information RP, the kernel size and numerical value operational coefficients are set in the register (ST102).

Then, for the image data which was captured at the imaging element 120 and input to the two-dimensional convolution operation part 142 through the AFE130, the convolution operation is carried out based on the data stored in the register, and the computed and converted data is transferred to the camera signal processing part 150 (ST103).

The convolution operation is represented by the following equation.

$$B_{(i,j)} = \sum_{l=-n}^{+n} \sum_{k=-n}^{+n} f_{(k,l)} * A_{(i+k,j+l)}$$ [Equation 4]

Note, f indicates a filter kernel (here, for facilitating the computation, use is made of one which has been already rotated by 180 degrees).

Further, A indicates an original image, and B indicates a filtered image (blurriness restored image).

As seen from this equation, the results obtained by superimposing f on the image and adding taps to each other are defined as values of superimposed center coordinates of those.

As explained above, the convolution processing is carried out at the image processing device 140. The pixel data from the imaging element 120 is convoluted according to Equation 4.

The image processing device 140 first restores the blurriness due to the phase modulation element by using the blurriness restoration filter of the phase modulation element, in other words, by reading the filter coefficient for restoration of blurriness due to the phase modulation element from the kernel data storage ROM 143 and the restoration processing is carried out by using this filter coefficient.

Then, after the processing, the blurriness due to the phase modulation element is reduced.

Below, a more specific example for the signal processing part and kernel data storage ROM of the image processing device 140 will be explained.

Figure 13:
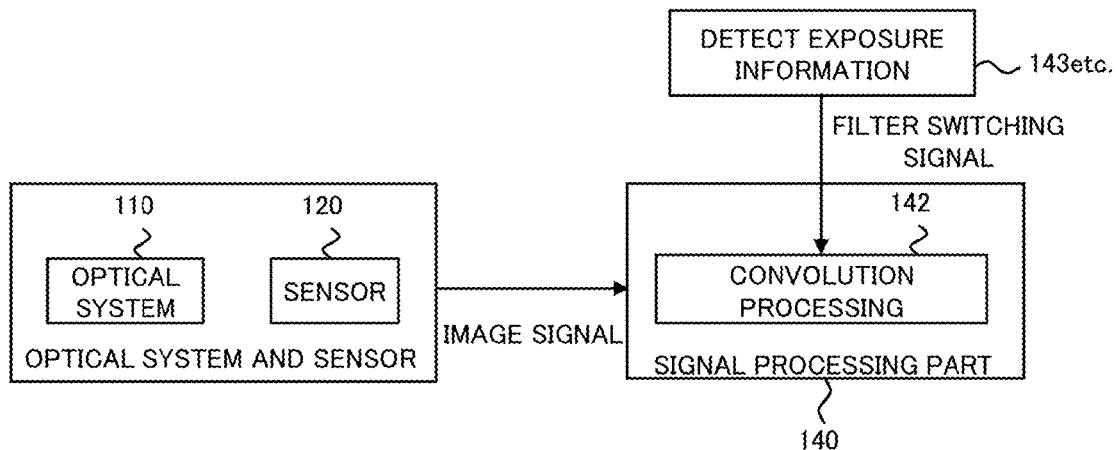
FIG. 13 is a view showing a first example of the configuration of a signal processing part and a kernel data storage ROM.

FIG. 13 is a view showing a first example of the configuration for the signal processing part and the kernel data storage ROM. Note that, the AFE etc. are omitted for simplification.

The example of FIG. 13 is a block diagram in a case where a filter kernel in accordance with the exposure information is prepared in advance.

The exposure information determined at the time of setting of the exposure is acquired, and the kernel data is selected and controlled through the convolution control part 144. In the two-dimensional convolution operation part 142, the convolution processing is applied by using the kernel data.

Figure 14:
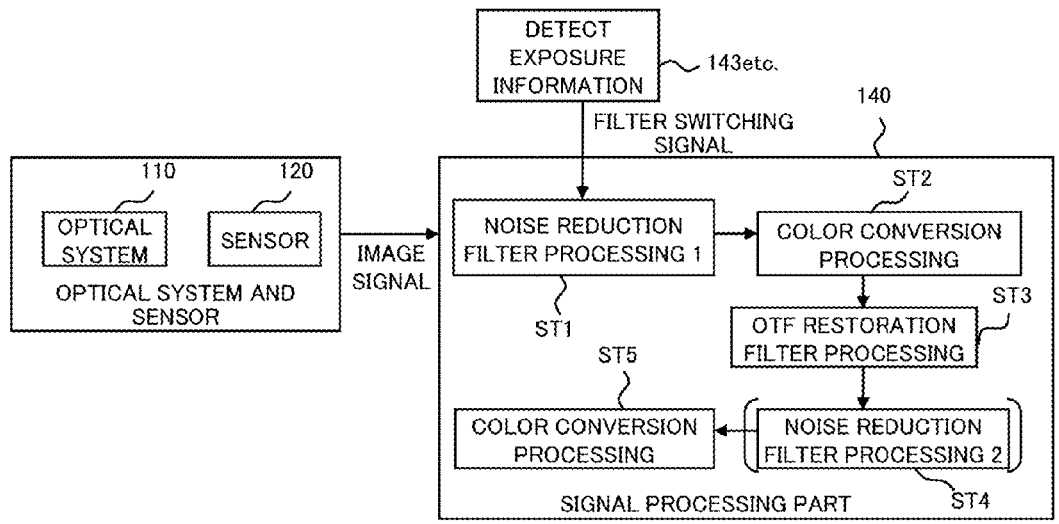
FIG. 14 is a view showing a second example of the configuration of a signal processing part and a kernel data storage ROM.

FIG. 14 is a view showing a second example of the configuration for the signal processing part and the kernel data storage ROM. Note that, the AFE etc. are omitted for simplification.

The example of FIG. 14 is a block diagram in a case where a step of noise reduction filter processing is provided at the start of the signal processing part, and noise reduction filter processing ST1 in accordance with the exposure information is prepared in advance as the filter kernel data.

The exposure information determined at the time of setting of the exposure is acquired, and the kernel data is selected and controlled through the convolution control part 144.

The two-dimensional convolution operation part 142 applies the noise reduction filter ST1, converts the color space by color conversion processing ST2, then applies convolution processing ST3 by using the kernel data.

Noise processing ST4 is carried out again, then the color space is returned to the original space by color conversion processing ST5. As the color conversion processing, there can be mentioned, for example, YCbCr conversion. However, another conversion may be carried out as well.

Note that, it is also possible to omit re-doing of noise processing ST4.

Figure 15:
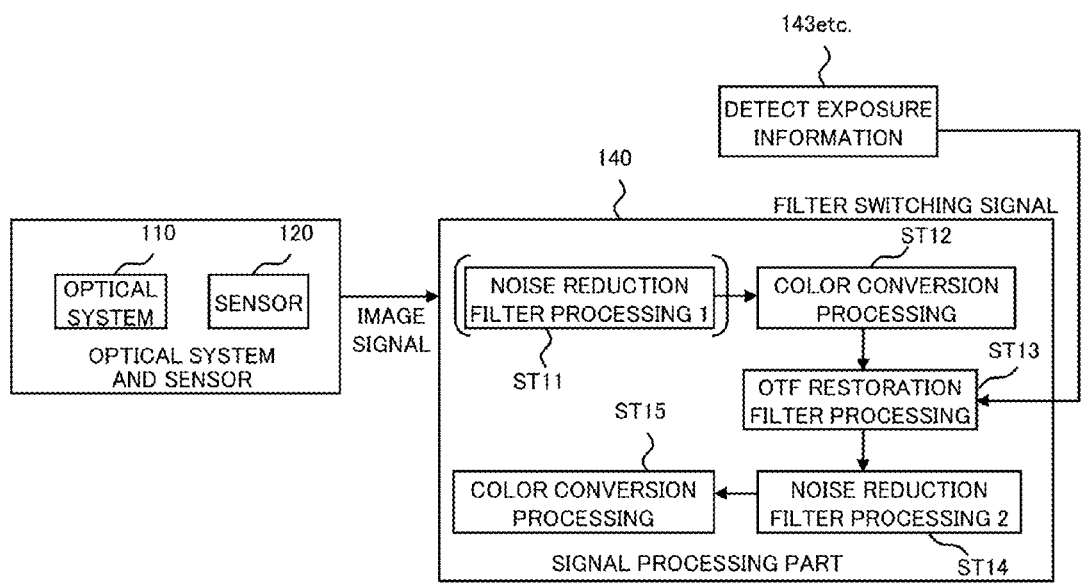
FIG. 15 is a view showing a third example of the configuration of a signal processing part and a kernel data storage ROM.

FIG. 15 is a view showing a third example of the configuration of the signal processing part and the kernel data storage ROM. Note that, the AFE etc. are omitted for simplification.

The example of FIG. 15 is a block diagram in a case where an OTF restoration filter in accordance with the exposure information is prepared in advance.

The exposure information determined at the time of setting of the exposure is acquired, and the kernel data is selected and controlled through the convolution control part 144.

The two-dimensional convolution operation part 142 applies convolution processing ST13 by using the OTF restoration filter after noise reduction processing ST11 and color conversion processing ST12.

Noise processing ST14 is carried out again, and the color space is returned to the original space by color conversion processing ST15. As the color conversion processing, there can be mentioned, for example, YCbCr conversion. However, another conversion may be carried out as well.

Note that, either of the noise reduction processing ST11 or ST14 may be carried out as well.

Figure 16:
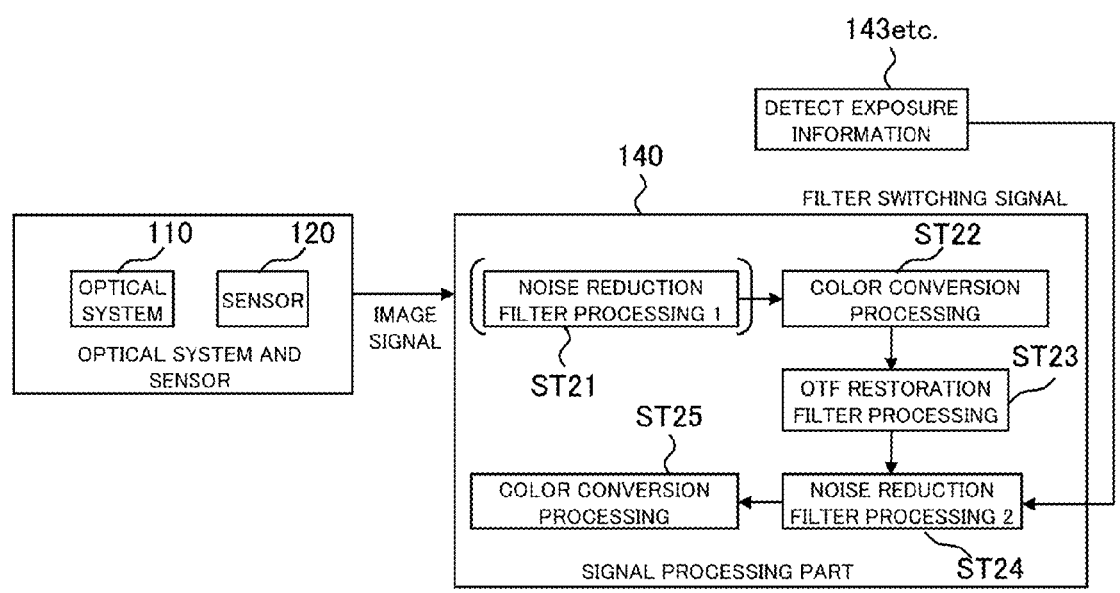
FIG. 16 is a view showing a fourth example of the configuration of a signal processing part and a kernel data storage ROM.

FIG. 16 is a view showing a fourth example of the configuration of the signal processing part and the kernel data storage ROM. Note that, the AFE etc. are omitted for simplification.

The example of FIG. 16 is a block diagram in a case where a step of noise reduction filter processing is provided, and a noise reduction filter in accordance with the exposure information is prepared in advance as the filter kernel data.

The exposure information determined at the time of setting of the exposure is acquired, and the kernel data is selected and controlled through the convolution control part 144.

The two-dimensional convolution operation part 142 applies noise reduction filter processing ST21, then converts the color space by color conversion processing ST22, then applies convolution processing ST23 using the kernel data.

Noise processing ST24 in accordance with the exposure information is carried out again, and the color space is returned to the original space by color conversion processing ST25. As the color conversion processing, there can be mentioned, for example, YCbCr conversion. However, another conversion may be carried out as well.

Note that, it is also possible to omit the noise reduction processing ST21.

Examples of performing filter processing in the two-dimensional convolution operation part 142 in accordance with only the exposure information were explained above. However, it becomes possible to extract suitable operational coefficients or perform computation by combining, for example, the object distance information, zoom information, or imaging mode information with the exposure information.

Figure 17:
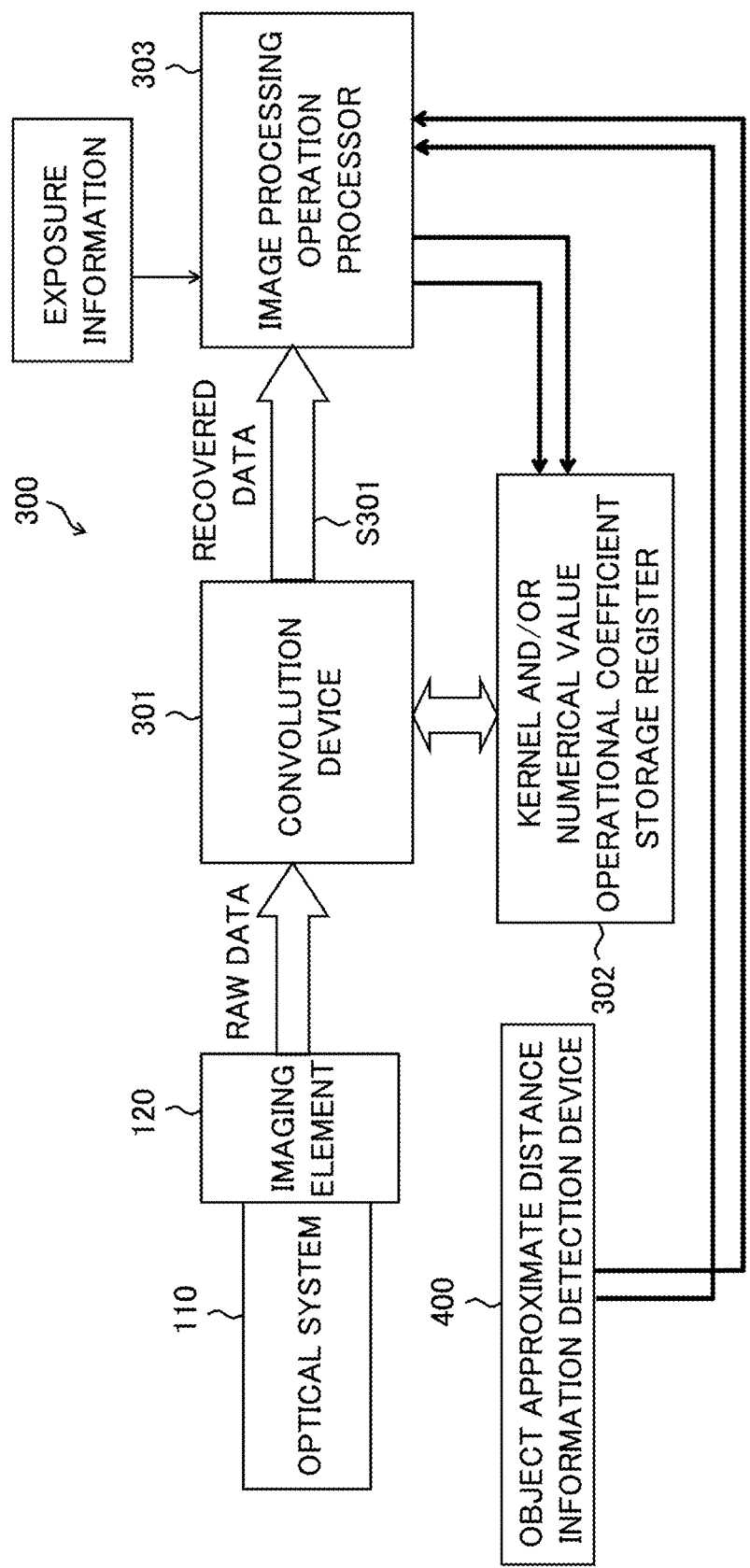
FIG. 17 is a view showing an example of the configuration of an image processing device combining object distance information and exposure information.

FIG. 17 is a view showing an example of the configuration of an image processing device combining the object distance information and the exposure information.

In FIG. 17, a dispersion-free image signal is generated from a dispersed image signal of the object from the imaging element 120. An example of the configuration of the image processing device 300 is shown.

The image processing device 300, as shown in FIG. 17, has a convolution device 301, kernel and/or numerical value operational coefficient storage register (hereinafter, sometimes simply referred to as a "register") 302, and image processing operation processor 303.

In this image processing device 300, the image processing operation processor 303 obtaining information concerning the approximate distance of the object distance of the object read out from the object approximate distance information detection device 400 and the exposure information stores the kernel size and its operational coefficients used in suitable operation with respect to the object distance position in the kernel and/or numerical value operational coefficient storage register 302 and performs the suitable operation at the convolution device 301 by using those values for operation to restore the image.

As explained above, in the case of the imaging device provided with a light wavefront modulation function, if within a predetermined focal length range, a suitable aberration-free image signal can be generated by image processing concerning that range, but if out of the predetermined focal length range, there is a limit to the correction of the image processing, therefore only an object out of the above range ends up becoming an image signal with aberration.

Further, on the other hand, by applying image processing not causing aberration within a predetermined narrow range, it also becomes possible to give blurriness to an image out of the predetermined narrow range.

The present example is configured to detect the distance up to the main object by the object approximate distance information detection device 400 including the distance detection sensor and perform processing for image correction differing in accordance with the detected distance.

The above image processing is carried out by convolution operation. In order to accomplish this, for example, it is possible to employ a configuration commonly storing one type of operational coefficient for convolution operation, storing in advance a correction coefficient in accordance with the focal length, correcting the operational coefficient by using this correction coefficient, and performing an adaptive convolution operation by the corrected operational coefficient.

Other than this configuration, it is possible to employ the following configurations.

It is possible to employ a configuration storing in advance the kernel size and the operational coefficient per se of convolution in accordance with the focal length and performing the convolution operation by these stored kernel size and operational coefficient, a configuration storing in advance an operational coefficient in accordance with the focal length as a function, finding the operational coefficient by this function according to the focal length, and performing the convolution processing by the computed operational coefficient, and so on.

When linking this with the configuration of FIG. 17, the following configuration can be employed.

At least two conversion coefficients corresponding to the aberration due to at least the phase plate 113 are stored in advance in the register 302 as the conversion coefficient storing means in accordance with the object distance. The image processing operation processor 303 functions as the coefficient selecting means for selecting a conversion coefficient in accordance with the distance up to the object from the register 302 based on the information generated by the object approximate distance information detection device 400 as the object distance information generating means.

Then, the converting means constituted by the convolution device 301 converts the image signal according to the conversion coefficient selected at the coefficient selecting means constituted by the image processing operation processor 303.

Alternatively, as explained before, the conversion coefficient operation means constituted by the image processing operation processor 303 computes the conversion coefficient based on the information generated by the object distance information generating means constituted by the object approximate distance information detection device 400 and stores the same in the register 302.

Then, the converting means constituted by the convolution device 301 converts the image signal according to the conversion coefficient obtained by the conversion coefficient operation means constituted by the image processing operation processor 303 and stored in the register 302.

Alternatively, at least one correction value in accordance with the zoom position or zoom amount of the zoom optical system 110 is stored in advance in the register 302 as the correction value storing means. This correction value includes the kernel size of the object aberration image.

The register 302, functioning also as the second conversion coefficient storing means, stores in advance the conversion coefficient corresponding to the aberration due to the phase plate 113.

Then, based on the distance information generated by the object distance information generating means constituted by the object approximate distance information detection device 400, the correction value selecting means constituted by the image processing operation processor 303 selects the correction value in accordance with the distance up to the object from the register 302 as the correction value storing means.

The converting means constituted by the convolution device 301 converts the image signal based on the conversion coefficient obtained from the second conversion coefficient storing means constituted by the register 302 and the correction value selected by the correction value selecting means constituted by the image processing operation processor 303.

Figure 18:
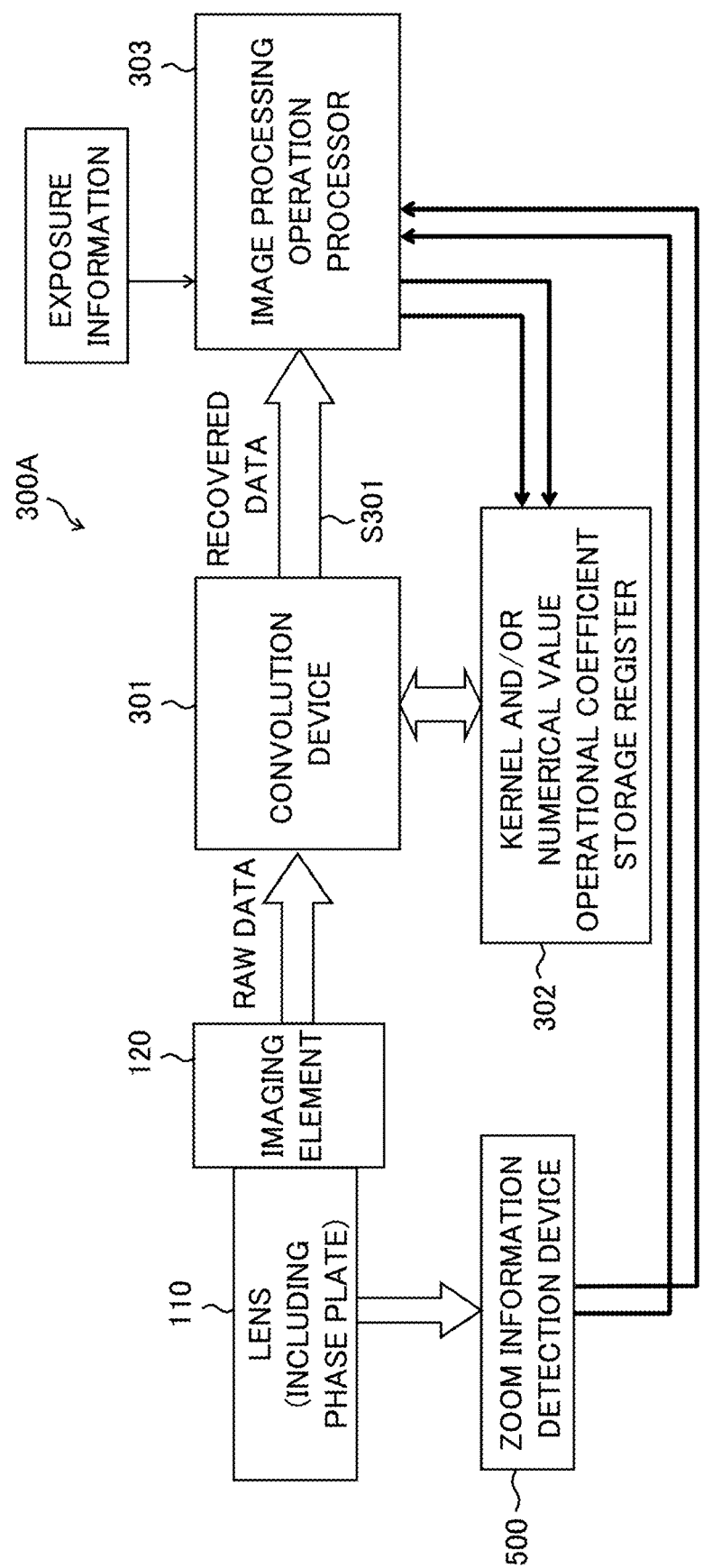
FIG. 18 is a view showing an example of the configuration of an image processing device combining zoom information and the exposure information.

FIG. 18 is a view showing an example of the configuration of an image processing device combining the zoom information and the exposure information.

FIG. 18 shows an example of the configuration of an image processing device 300A generating a dispersion-free image signal from a dispersed image signal of the object from the imaging element 120.

In the same way as FIG. 17, the image processing device 300A, as shown in FIG. 18, has a convolution device 301, kernel and/or numerical value operational coefficient storage register 302, and image processing operation processor 303.

In this image processing device 300A, the image processing operation processor 303 obtaining the information concerning the zoom position or zoom amount read out from the zoom information detection device 500 and the exposure information stores the kernel size and its operational coefficients used in a suitable operation with respect to the exposure information and its zoom position in the kernel and/or numerical value operational coefficient storage register 302 and performs a suitable operation at the convolution device 301 by using those values for operation to restore the image.

As explained above, when applying a phase plate as the light wavefront modulation element to an imaging device provided in a zoom optical system, the generated spot image differs according to the zoom position of the zoom optical system. For this reason, when performing the convolution operation of an off-focus image (spot image) obtained by the phase plate in a later stage DSP etc., in order to obtain the suitable focused image, convolution operation differing in accordance with the zoom position becomes necessary.

Therefore, the present embodiment is configured provided with the zoom information detection device 500, performing the suitable convolution operation in accordance with the zoom position, and obtaining the suitable focused image without regard as to the zoom position.

For suitable convolution operation in the image processing device 300A, it is possible to configure the system to commonly store one type of operational coefficient of convolution in the register 302.

Other than this configuration, it is also possible to employ the following configurations.

It is possible to employ a configuration storing in advance a correction coefficient in the register 302 in accordance with each zoom position, correcting the operational coefficient by using this correction coefficient, and performing the suitable convolution operation by the corrected operational coefficient, a configuration storing in advance the kernel size and the operational coefficient per se of the convolution in the register 302 in accordance with each zoom position and performing the convolution operation by these stored kernel size and operational coefficient, a configuration storing in advance the operational coefficient in accordance with the zoom position as a function in the register 402, finding the operational coefficient by this function according to the zoom position, and performing the convolution operation by the computed operational coefficient, and so on.

When linking this with the configuration of FIG. 18, the following configuration can be employed.

At least two conversion coefficients corresponding to aberrations caused by the light wavefront modulation element 114 in accordance with the zoom position or zoom amount of the zoom optical system 110 are stored in advance in the register 302 as the conversion coefficient storing means. The image processing operation processor 303 functions as the coefficient selecting means for selecting the conversion coefficient in accordance with the zoom position or zoom amount of the zoom optical system 110 from the register 302 based on the information generated by the zoom information generating means constituted by the zoom information detection device 600.

Then, the converting means constituted by the convolution device 301 converts the image signal according to the conversion coefficient selected at the coefficient selecting means constituted by the image processing operation processor 303.

Alternatively, as explained before, the conversion coefficient operation means constituted by the image processing operation processor 303 computes the conversion coefficient based on the information generated by the zoom information generating means constituted by the zoom information detection device 500 and stores the same in the register 302.

Then, the converting means constituted by the convolution device 301 converts the image signal according to the conversion coefficient obtained by the conversion coefficient operation means constituted by the image processing operation processor 303 and stored in the register 302.

Alternatively, at least one correction value in accordance with the zoom position or zoom amount of the zoom optical system 110 is stored in advance in the register 302 as the correction value storing means. This correction value includes the kernel size of the object aberration image.

The register 302 functioning also as the second conversion coefficient storing means stores in advance a conversion coefficient corresponding to the aberration due to the light wavefront modulation element 114.

Then, based on the zoom information generated by the zoom information generating means constituted by the zoom information detection device 500, the correction value selecting means constituted by the image processing operation processor 303 selects the correction value in accordance with the zoom position or zoom amount of the zoom optical system from the register 302 as the correction value storing means.

The converting means constituted by the convolution device 301 converts the image signal based on the conversion coefficient obtained from the second conversion coefficient storing means constituted by the register 302 and the correction value selected by the correction value selecting means constituted by the image processing operation processor 303.

Figure 19:
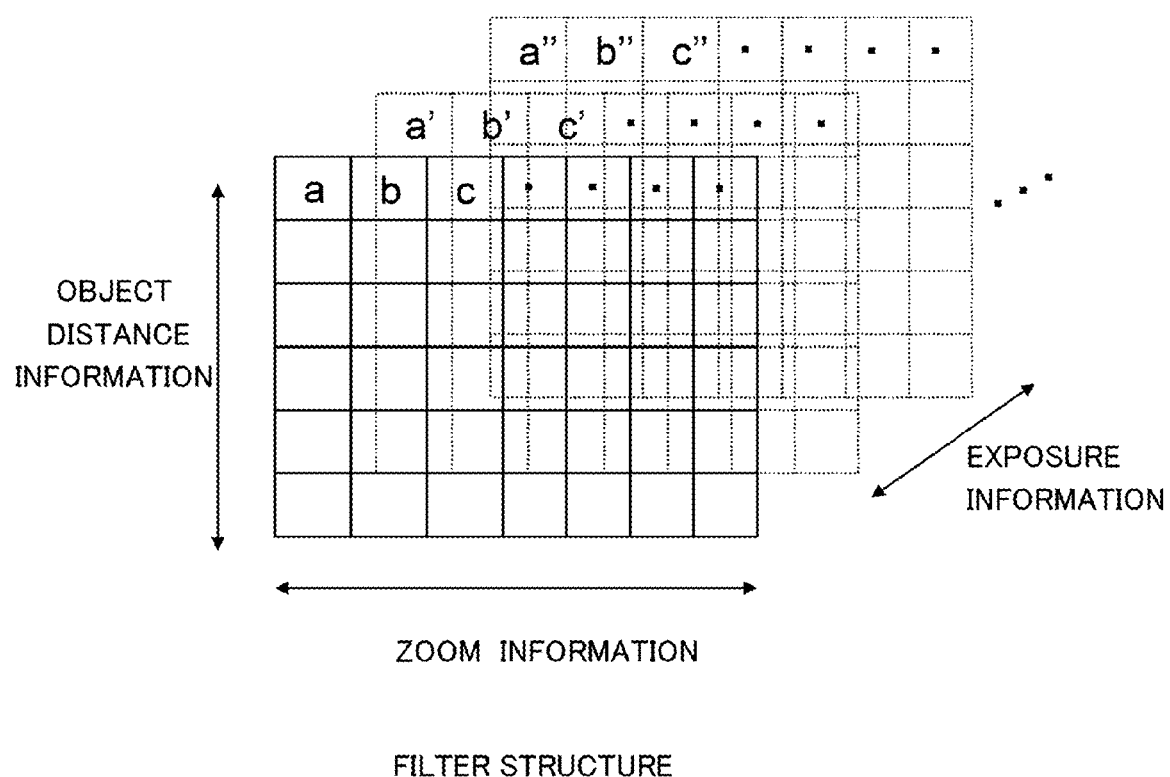
FIG. 19 is a view showing an example of the configuration of a filter in a case using exposure information, object distance information, and zoom information.

FIG. 19 shows an example of the configuration of a filter when using the exposure information, object distance information, and zoom information.

In this example, the two-dimensional information is formed by the object distance information and zoom information, and the exposure information forms depth-like information.

Note that, by employing three dimensions and, further, four or more dimensions as shown in FIG. 19, the storage amount becomes large. However, it becomes possible to select a more suitable information by taking various conditions into account. The information may be the exposure information, object distance information, zoom information, etc. explained above.

Note that, as explained above, in the case of the imaging device having the light wavefront modulation element, if within a predetermined focal length range, a suitable aberration-free image signal can be generated by image processing concerning that range, but if out of the predetermined focal length range, there is a limit to the correction of the image processing, therefore only an object out of the above range ends up becoming an image signal with aberration.

Further, on the other hand, by applying image processing not causing aberration within a predetermined narrow range, it also becomes possible to give blurriness to an image out of the predetermined narrow range.

In the present embodiment, the DEOS is employed, so it is possible to obtain a high definition image quality. In addition, the optical system can be simplified, and the cost can be reduced.

Below, these characteristic features will be explained.

Figure 20A:
Figure 20B:
Figure 20C:

FIG. 20A to FIG. 20C show spot images on the light reception surface of the imaging element 120.

FIG. 20A shows a spot image in the case where the focal point is deviated by 0.2 mm (defocus=0.2 mm), FIG. 20B shows a spot image in the case of focus (best focus), and FIG. 20C shows a spot image in the case where the focal point is deviated by −0.2 mm (defocus=−0.2 mm).

As seen also from FIG. 20A to FIG. 20C, in the imaging device 100 according to the present embodiment, light beams having a deep depth (playing a central role in the image formation) and flare (blurred portion) are formed by the light wavefront modulation function.

Figure 21A:
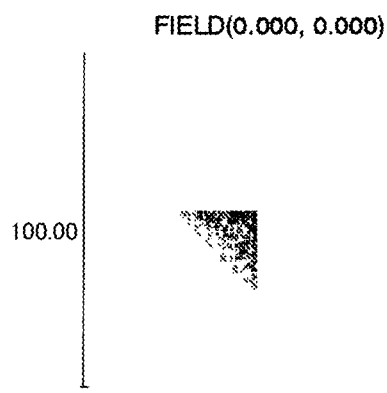
Figure 21B:
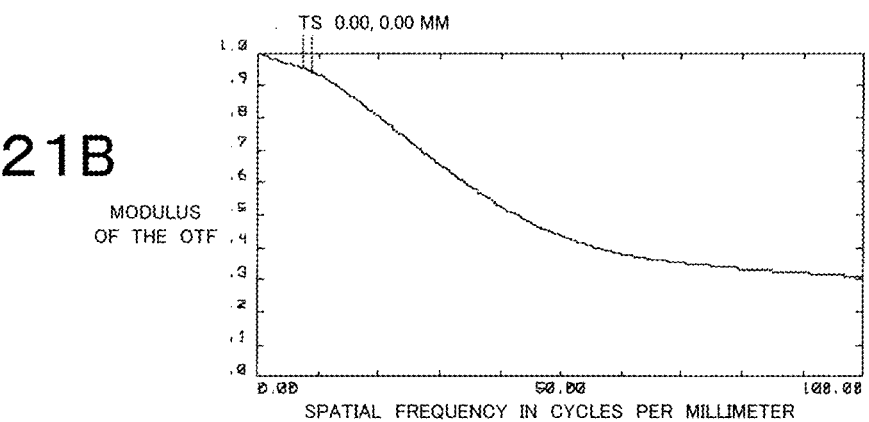

In this way, the first order image FIM formed in the imaging device 100 of the present embodiment is given light beams with deep depth FIGS. 21A and 21B are views for explaining a modulation transfer function (MTF) of the first order image formed by the imaging lens device according to the present embodiment, in which FIG. 21A is a view showing a spot image on the light receiving surface of the imaging element of the imaging lens device, and FIG. 21B shows the MTF characteristic with respect to the spatial frequency.

In the present embodiment, the high definition final image is left to the correction processing of the later stage image processing device 140 configured by, for example, a digital signal processor. Therefore, as shown in FIGS. 21A and 21B, the MTF of the first order image essentially becomes a low value.

The image processing device 140, as explained above, receives the first order image FIM by the imaging element 120, applies predetermined correction processing etc. for boosting the MTF at the spatial frequency of the first order image, and forms a high definition final image FNLIM.

Figure 22:
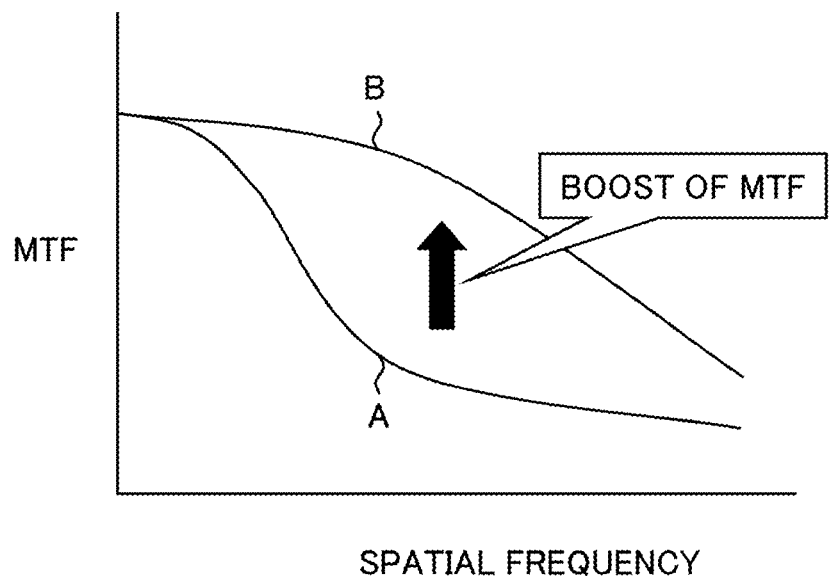
FIG. 22 is a view for explaining MTF correction processing in an image processing device according to the present embodiment.

The MTF correction processing of the image processing device 140 performs correction so that, for example as indicated by a curve A of FIG. 22, the MTF of the first order image which essentially becomes a low value approaches (reaches) the characteristic indicated by a curve B in FIG. 22 by post-processing such as edge enhancement and chroma enhancement by using the spatial frequency as a parameter.

The characteristic indicated by the curve B in FIG. 22 is the characteristic obtained in the case where the light wavefront modulation function is not manifested and the wavefront is not deformed as in for example the present embodiment.

Note that all corrections in the present embodiment are according to the parameter of the spatial frequency.

In the present embodiment, as shown in FIG. 22, in order to achieve the MTF characteristic curve B desired to be finally realized with respect to the MTF characteristic curve A for the optically obtained spatial frequency, the strength of the edge enhancement etc. is adjusted for each spatial frequency to correct the original image (first order image).

Figure 23:
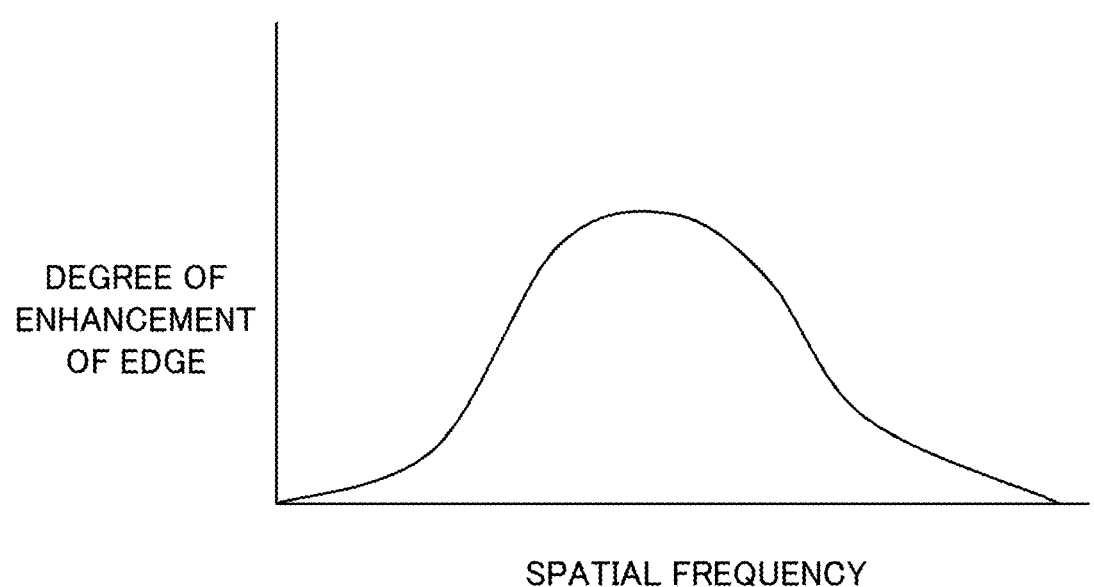
FIG. 23 is a view for concretely explaining MTF correction processing in an image processing device according to the present embodiment.

For example, in the case of the MTF characteristic of FIG. 22, the curve of the edge enhancement with respect to the spatial frequency becomes as shown in FIG. 23.

Namely, by performing the correction by weakening the edge enhancement on the low frequency side and high frequency side within a predetermined bandwidth of the spatial frequency and strengthening the edge enhancement in an intermediate frequency zone, the desired MTF characteristic curve B is virtually realized.

In this way, the imaging device 100 according to the embodiment is basically an image forming system configured by the optical system 110 and imaging element 120 for forming the first order image and the image processing device 140 for forming the first order image to a high definition final image, wherein, by newly providing an optical element capable of switching between manifestation and non-manifestation of the light wavefront modulation function in the optical system or providing an inverse light wavefront modulation element capable of canceling the light wavefront modulation function in the optical system having the light wavefront modulation function, the wavefront of the formed image is deformed (modulated), such a wavefront is focused onto the imaging surface (light receiving surface) of the imaging element 120 formed by a CCD or CMOS sensor, and the image-formed first order image is passed through the image processing device 140 to obtain the high definition image.

In the present embodiment, the first order image by the imaging element 120 is given light beam conditions with very deep depth. For this reason, the MTF of the first order image inherently becomes a low value, and the MTF thereof is corrected by the image processing device 140.

Here, the process of image formation in the imaging device 100 in the present embodiment will be considered in terms of wave optics.

A spherical wave scattered from one point of an object point becomes a converged wave after passing through the imaging optical system. At that time, when the imaging optical system is not an ideal optical system, aberration occurs. The wavefront becomes not spherical, but a complex shape. Geometric optics and wave optics are bridged by wavefront optics. This is convenient in the case where a wavefront phenomenon is handled.

When handling a wave optical MTF on an imaging plane, the wavefront information at an exit pupil position of the imaging optical system becomes important.

The MTF is calculated by a Fourier transform of the wave optical intensity distribution at the imaging point. The wave optical intensity distribution is obtained by squaring the wave optical amplitude distribution. That wave optical amplitude distribution is found from a Fourier transform of a pupil function at the exit pupil.

Further, the pupil function is the wavefront information (wavefront aberration) at the exit pupil position itself, therefore if the wavefront aberration can be strictly calculated as a numerical value through the optical system 110, the MTF can be calculated.

Accordingly, if modifying the wavefront information at the exit pupil position by a predetermined technique, the MTF value on the imaging plane can be freely changed.

In the present embodiment as well, the shape of the wavefront is mainly changed by a wavefront forming optical element. It is truly the phase (length of light path along the rays) that is adjusted to form the desired wavefront.

Then, when forming the target wavefront, the exit light beams from the exit pupil are formed by a dense ray portion and a sparse ray portion as seen from the geometric optical spot images shown in FIG. 20A to FIG. 20C.

The MTF of this state of light beams exhibits a low value at a position where the spatial frequency is low and somehow maintains the resolution up to the position where the spatial frequency is high.

Namely, if this low MTF value (or, geometrically optically, the state of the spot image), the phenomenon of aliasing will not be caused.

That is, a low pass filter is not necessary.

Further, the flare-like image causing a drop in the MTF value may be eliminated by the image processing device 140 configured by the later stage DSP etc. Due to this, the MTF value is remarkably improved.

Next, responses of the MTF in the present embodiment and the conventional optical system will be considered.

Figure 24:
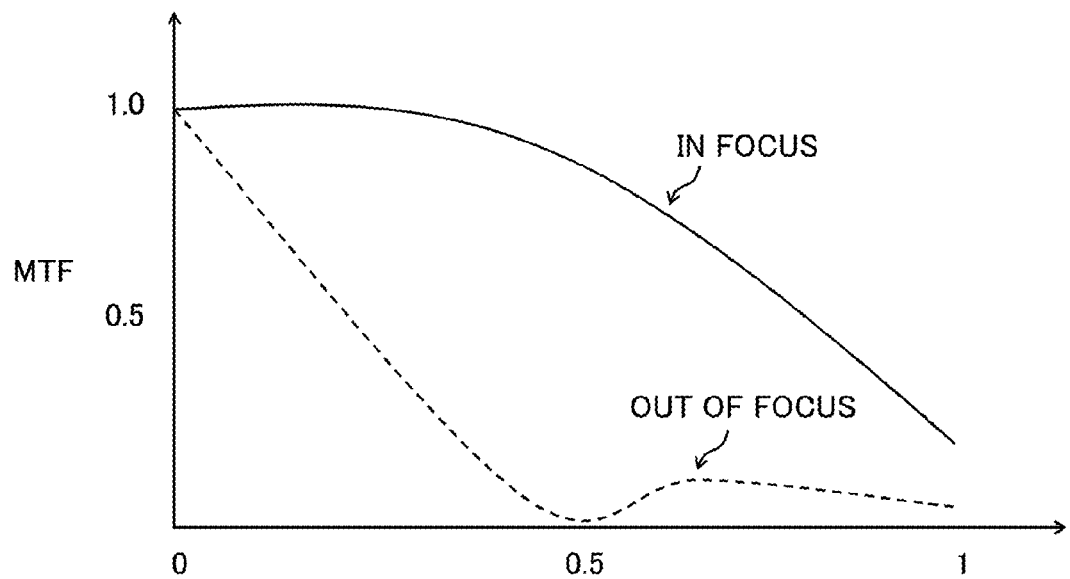
FIG. 24 is a view showing responses of the MTF when the object is located at the position of the focal point and when it is out of the position of the focal point in the case of the usual optical system.

FIG. 24 is a view showing responses of the MTF when the object is located at the focal point position and is out of the focal point position in the case of the usual optical system.

Figure 25:
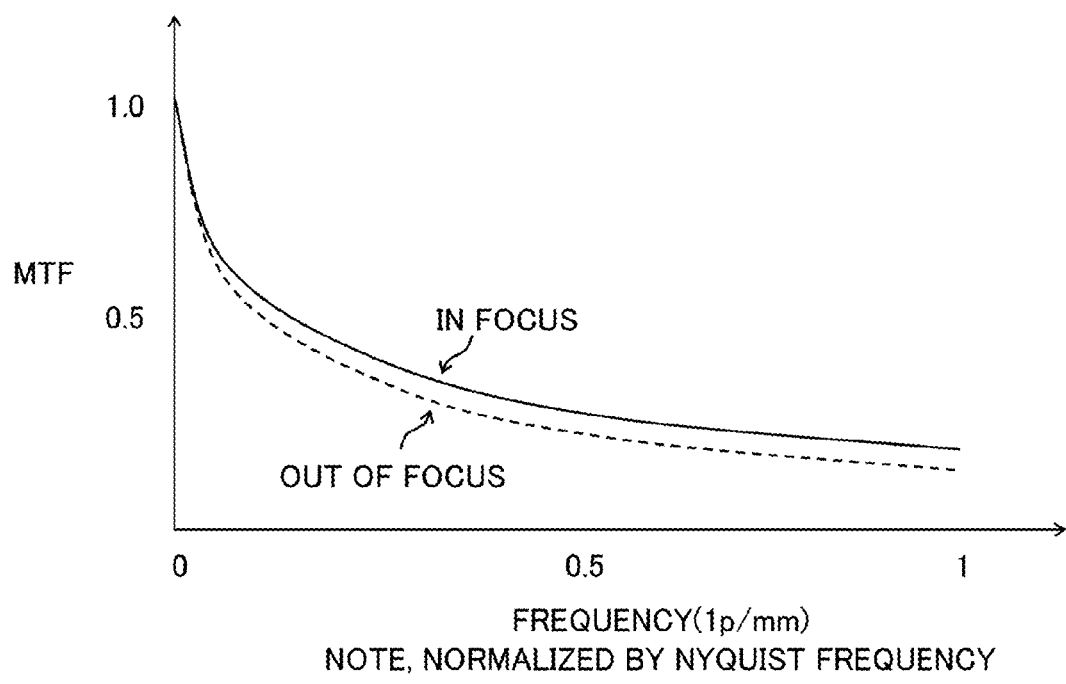
FIG. 25 is a view showing responses of the MTF when the object is located at the position of the focal point and when it is out of the position of the focal point in the case of the optical system of the present embodiment having a light wavefront modulation element.

FIG. 25 is a view showing responses of the MTF when the object is located at the focal point position and is out of the focal point position in the case of the optical system of the present embodiment having the light wavefront modulation element.

Figure 26:
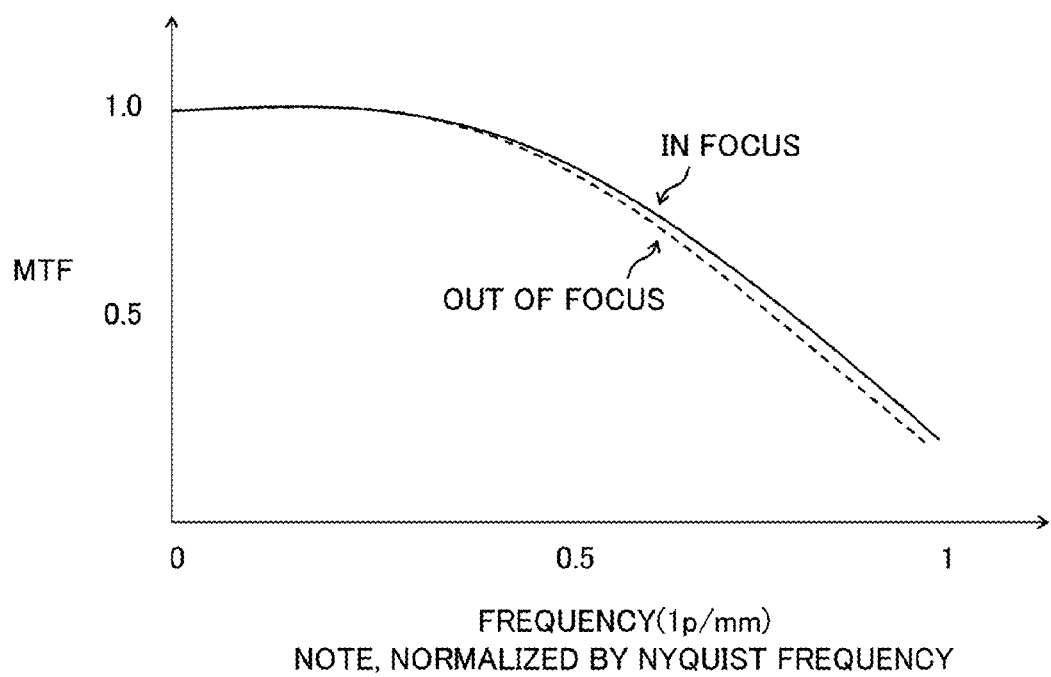
FIG. 26 is a view showing the response of the MTF after data restoration of the imaging device according to the present embodiment.

Further, FIG. 26 is a view showing the response of the MTF after the data restoration of the imaging device according to the present embodiment.

As seen from the drawings as well, in the case of the optical system having the light wavefront modulation element, even in the case where the object is out of the focal point position, the change of the response of the MTF becomes smaller than an optical diameter not inserting a light wavefront modulation element.

By processing the image focused by this optical system according to the convolution filter, the response of the MTF is improved.

As explained above, according to the present embodiment, the device has a zoom optical system 100 including a light wavefront modulation element 114 having a light wavefront modulation function and capable of adjusting the light wavefront modulation pattern, an imaging element 120 capturing an object image passed through the zoom optical system, a modulation function (pattern) control part 200 controlling the light wavefront modulation pattern of the light wavefront modulation element, and the image processing part 140 applying predetermined processing to the image signal of the object from the imaging element 120, the zoom optical system 110 is a movable lens type zoom optical system moving the lens in the light axis direction, and the modulation function (pattern) control part 200 controls the light wavefront modulation pattern of the light wavefront modulation element in accordance with the information concerning the movement of the lens of the zoom optical system, or the zoom optical system 110A is a non-movable lens type zoom optical system having a lens fixed in the position, and the modulation function (pattern) control part 200A controls the light wavefront modulation pattern of the light wavefront modulation element in accordance with the information concerning the zoom control of the zoom optical system.

Accordingly, the following effects can be obtained.

In the depth expansion optical system, a switching mechanism of the light modulation element is unnecessary, a precise modulation pattern in accordance with the change of the zoom position can be realized, and blurriness giving a good restored image can be realized.

Further, the focus adjustment uses the DEOS technique, therefore a restored image focused at the entire image can be provided. In particular, in a monitor camera or other electronic image system, this may be the optimal optical system.

Further, in the image processing device 140, the filter processing is carried out for the optical transfer function (OTF) in accordance with the exposure information from the exposure control device 190, therefore there are the advantages that the optical system can be simplified, the cost can be reduced, and in addition a restored image with little influence of noise can be obtained.

Further, by making the kernel size used at the time of the convolution operation and the coefficients used in the operation of the numerical value thereof variable and linking the kernel size learned from the input of the operation part 180 or the like and becoming suitable with the above coefficients, there are the advantages that lenses can be designed without regard as to the magnification and defocus range and it becomes possible to restore an image by high precision convolution.

Further, there are the advantages that a so-called natural image where the object to be captured is in focus, but the background is blurred can be obtained without requiring optical lenses having a high difficulty, expensive cost, and large size and without driving the lenses.

Then, the imaging device 100 according to the present embodiment can be used for the DEOS of a zoom lens designed considering small size, light weight, and cost in a digital camera, camcorder, or other consumer electronic device.

Further, in the present embodiment, since the apparatus has the imaging lens system having the wavefront forming optical element for deforming the wavefront of the image formed on the light receiving surface of the imaging element 120 by the imaging lens 112 and the image processing device 140 for receiving the first order image FIM by the imaging element 120 and applying predetermined correction processing etc. to boost the MTF at the spatial frequency of the first order image and form the high definition final image FNLIM, there is the advantage that the acquisition of a high definition image quality becomes possible.

Further, the configuration of the optical system 110 can be simplified, production becomes easy, and the cost can be reduced.

In this regard, when using a CCD or CMOS sensor as the imaging element, there is a resolution limit determined from the pixel pitch. When the resolution of the optical system is over that limit resolution power, the phenomenon of aliasing is generated and exerts an adverse influence upon the final image. This is a known fact.

For the improvement of the image quality, desirably the contrast is raised as much as possible, but this requires a high performance lens system.

However, as explained above, when using a CCD or CMOS sensor as the imaging element, aliasing occurs.

At present, in order to avoid the occurrence of aliasing, the imaging lens device jointly uses a low pass filter made of a uniaxial crystalline system to thereby avoid the phenomenon of the aliasing.

The joint usage of the low pass filter in this way is correct in terms of principle, but the low pass filter per se is made of crystal, therefore is expensive and hard to manage. Further, there is the disadvantage that the optical system is more complicated due to the use in the optical system.

As described above, a higher definition image quality is demanded as a trend of the times. In order to form a high definition image, the optical system in a general imaging lens device must be made more complicated. If it is complicated, production becomes difficult. Also, the utilization of the expensive low pass filters leads to an increase in the cost.

However, according to the present embodiment, the occurrence of the phenomenon of aliasing can be avoided without using a low pass filter, and it becomes possible to obtain a high definition image quality Note that, in the present embodiment, the example of arranging the wavefront forming optical element of the optical system on the object side lens from the stop was shown, but functional effects the same as those described above can be obtained even by arranging the wavefront forming optical element at a position the same as the position of the stop or on the imaging lens side from the stop.

INDUSTRIAL APPLICABILITY

The imaging device and imaging method of the present invention do not need the switching mechanism of the modulation element in the depth expansion optical system and can realize a precise modulation pattern in accordance with the change of the zoom position, therefore can be applied to a digital still camera, a camera mounted in a mobile phone, a camera mounted in a digital personal assistant, and so on.

We claim:

1. An imaging device, comprising:
   a zoom optical system including a light wavefront modulation element which has a light wavefront modulation function and is able to adjust a light wavefront modulation pattern and a zoom control configured to control a zoom amount of the zoom optical system,
   an imaging element capturing an image of an object passed through the zoom optical system,
   a modulation pattern control part configured to control the light wavefront modulation pattern of the light wavefront modulation element in accordance with information concerning the zoom amount, and
   an image processing part applying predetermined processing to an image signal of the object from the imaging element.

2. An imaging device as set forth in claim 1, wherein
   the zoom optical system is a movable lens type zoom optical system including a lens movable in a light axis direction, the zoom control controlling movement of the lens to vary the zoom amount, and
   the modulation pattern control part controls the light wavefront modulation pattern of the light wavefront modulation element in accordance with information concerning the movement of the lens of the zoom optical system.

3. An imaging device as set forth in claim 2, wherein the information concerning the movement of the lens includes position information of the lens or drive information of the lens.

4. An imaging device as set forth in claim 1, wherein
   the zoom optical system is a non-movable lens type zoom optical system having a lens fixed in position, and
   the modulation pattern control part controls the light wavefront modulation pattern of the light wavefront modulation element in accordance with information concerning the zoom control of the zoom optical system.

5. An imaging device as set forth in claim 1, wherein the light wavefront modulation element is an outside dependent type light wavefront modulation element in which the control of the light wavefront modulation pattern depends on an outside element.

6. An imaging device as set forth in claim 4, wherein
   the light wavefront modulation element is an outside dependent type light wavefront modulation element in which the control of the light wavefront modulation pattern depends on an external voltage from the outside,
   the information concerning the zoom control includes a voltage value for each zoom position, and
   the modulation pattern control part applies a voltage in accordance with the voltage value for each zoom position as the external voltage to the outside dependent type light wavefront modulation element and controls the light wavefront modulation pattern.

7. An imaging device as set forth in claim 1, wherein
   the image processing part has a function of performing filter processing for an optical transfer function (OTF) in accordance with the predetermined information, and
   the control of the modulation pattern of the modulation pattern control part is linked with switching of a filter acting upon the image processing part.

8. An imaging device as set forth in claim 2, wherein
   the image processing part has a function of performing filter processing for an optical transfer function (OTF) in accordance with the predetermined information, and
   the control of the modulation pattern of the modulation pattern control part is linked with switching of a filter acting upon the image processing part.

9. An imaging device as set forth in claim 6, wherein
   the image processing part has a function of performing filter processing for an optical transfer function (OTF) in accordance with the predetermined information, and
   the control of the modulation pattern of the modulation pattern control part is linked with switching of the filter acting upon the image processing part.

10. An imaging method, comprising:
    a first step of controlling a light wavefront modulation pattern of a light wavefront modulation element of a zoom optical system in accordance with zoom control of a zoom amount of the zoom optical system,
    a second step of capturing an object image passed through the zoom optical system including the light wavefront modulation element by an imaging element, and
    a third step of applying predetermined processing to an image signal of the object image from the imaging element.

11. An imaging method as set forth in claim 10, wherein
    the zoom optical system is a movable lens type zoom optical system including a lens movable in a light axis direction, the zoom control controlling movement of the lens to vary the zoom amount, and the first step controls the light wavefront modulation pattern of the light wavefront modulation element in accordance with information concerning the movement of the lens of the zoom optical system.

12. An imaging method as set forth in claim 10, wherein the zoom optical system is a non-movable lens type zoom optical system having a lens fixed in position, and
the first step controls the light wavefront modulation pattern of the light wavefront modulation element in accordance with information concerning the zoom control of the zoom optical system.

\* \* \* \* \*